(12) United States Patent
Yu et al.

(10) Patent No.: US 8,209,664 B2
(45) Date of Patent: Jun. 26, 2012

(54) HIGH LEVEL PROGRAMMING EXTENSIONS FOR DISTRIBUTED DATA PARALLEL PROCESSING

(75) Inventors: Yuan Yu, Cupertino, CA (US); Ulfar Erlingsson, Reykjavik (IS); Michael A Isard, San Francisco, CA (US); Frank McSherry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 12/406,826

(22) Filed: Mar. 18, 2009

(65) Prior Publication Data

US 2010/0241827 A1    Sep. 23, 2010

(51) Int. Cl.
*G06F 9/44* (2006.01)
(52) U.S. Cl. ........................................ 717/119
(58) Field of Classification Search .................. 717/106, 717/109, 114, 119
See application file for complete search history.

(56) References Cited

U.S. PATENT DOCUMENTS

| | | | | |
|---|---|---|---|---|
| 7,802,180 | B2 * | 9/2010 | Warner et al. ................. | 715/234 |
| 2005/0177585 | A1 * | 8/2005 | Venkatesh et al. ............ | 707/100 |
| 2006/0116578 | A1 * | 6/2006 | Grunwald et al. ............ | 600/440 |
| 2007/0011155 | A1 | 1/2007 | Sarkar | |
| 2007/0038659 | A1 | 2/2007 | Datar et al. | |
| 2007/0043531 | A1 * | 2/2007 | Kosche et al. ................ | 702/182 |
| 2008/0005547 | A1 | 1/2008 | Papakipos et al. | |
| 2008/0034357 | A1 | 2/2008 | Gschwind | |
| 2008/0079724 | A1 | 4/2008 | Isard et al. | |
| 2008/0082644 | A1 | 4/2008 | Isard et al. | |
| 2008/0086442 | A1 | 4/2008 | Dasdan et al. | |
| 2008/0098375 | A1 | 4/2008 | Isard | |
| 2008/0120314 | A1 | 5/2008 | Yang et al. | |
| 2008/0127200 | A1 | 5/2008 | Richards et al. | |
| 2008/0250227 | A1 | 10/2008 | Linderman et al. | |
| 2009/0043803 | A1 * | 2/2009 | Frishberg et al. ............. | 707/102 |
| 2009/0300656 | A1 * | 12/2009 | Bosworth et al. ............. | 719/320 |

OTHER PUBLICATIONS

Blelloch, Guy E., et al., "Implementation of a Portable Nested Data-Parallel Language," School of Computer Science, Carnegie Mellon University, Pittsburgh, PA, Feb. 1993, Abstract, pp. 1-28.

Isard, Michael, et al., "Dryad: Distributed Data-Parallel Programs from Sequential Building Blocks," Microsoft Research, Sillicon Valley, [http://research.microsoft.com/research/dv/dryad/eurosys07.pdf], Mar. 23, 2007, 14 pages.

Ferreira, Renato, et al., "Data parallel language and compiler support for data intensive applications*1," Elsevier Science B.V., Parallel Computing, vol. 28, Issue 5, May, 2002, 3 pages.

Carpenter, Bryan, et al., "HPJava: Data Parallel Extensions to Java," NPAC at Syracuse University, Syracuse, NY, Feb. 7, 1998, pp. 1-5.

(Continued)

*Primary Examiner* — Anna Deng
(74) *Attorney, Agent, or Firm* — Vierra Magen Marcus & DeNiro LLP

(57) ABSTRACT

General-purpose distributed data-parallel computing using high-level computing languages is described. Data parallel portions of a sequential program that is written by a developer in a high-level language are automatically translated into a distributed execution plan. A set of extensions to a sequential high-level computing language are provided to support distributed parallel computations and to facilitate generation and optimization of distributed execution plans. The extensions are fully integrated with the programming language, thereby enabling developers to write sequential language programs using known constructs while providing the ability to invoke the extensions to enable better generation and optimization of the execution plan for a distributed computing environment.

17 Claims, 18 Drawing Sheets

OTHER PUBLICATIONS

Duffy, Joe, et al., "Parallel LINQ—Running Queries on Multi-Core Processors," Microsoft Corporation, [http://msdn.microsoft.com/en-us/magazine/cc163329.aspx], 2008, 8 pages.

Yu, Yuan, et al., "DryadLINQ: A System for General-Purpose Distributed Data-Parallel Computing Using a High-Level Language," 8th Usenix Symposium on Operating Systems Design and Implementation, Dec. 8, 2008, pp. 1-14.

Yu, Yuan, et al., "Some sample programs written in DryadLINQ," Microsoft Corporation, ftp://ftp.research.microsoft.com/pub/tr/TR-2008-74.pdf, May 11, 2008, pp. 1-37.

Isard, Michael, Dryad and DryadLINQ, Presentation to Hadoop Summit, Microsoft Corporation, Mar. 25, 2008, 15 pages.

Isard, Michael, et al., "Simple programming for simple distributed systems," Cambridge SRG, Jun. 9, 2005.

Catanzaro, Bryan, et al., "A Map Reduce Framework for Programming Graphics Processors," University of California, Berkeley, CA, [http://web.mit.edu/rabbah/www/conferences/08/stmcs/papers/catanzaro-stmcs08.pdf], 2008, 6 pages.

Dean, Jeffrey, et al., "MapReduce: Simplified Data Processing on Large Clusters," Google, Inc., [http://labs.google.com/papers/mapreduce-osdi04.pdf], OSDI 2004, pp. 1-13.

Olston, Christopher, et al., "Automatic Optimization of Parallel Dataflow Programs," Yahoo! Research, [http://www.usenix.org/event/usenix08/tech/full_papers/olston/olston_html/index.html], Apr. 29, 2008, 11 pages.

U.S. Appl. No. 12/368,231, filed Feb. 9, 2009.

* cited by examiner

Figure 4
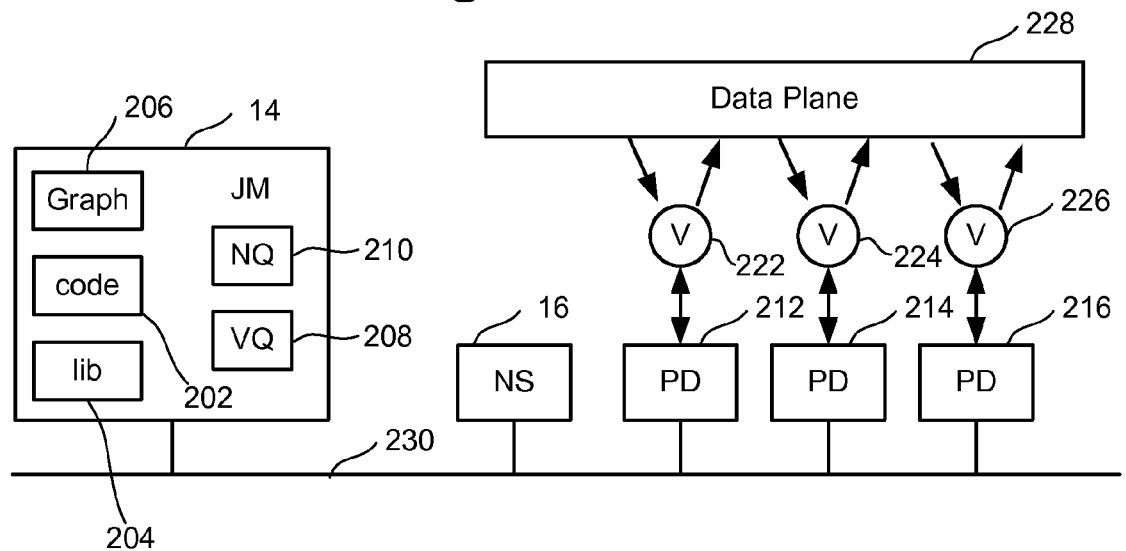
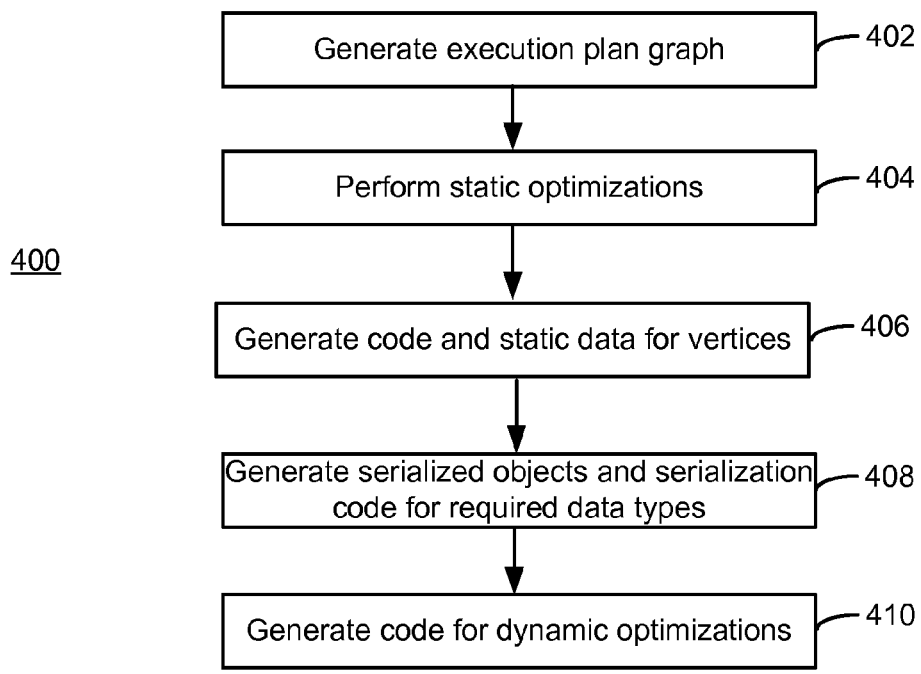
Figure 8

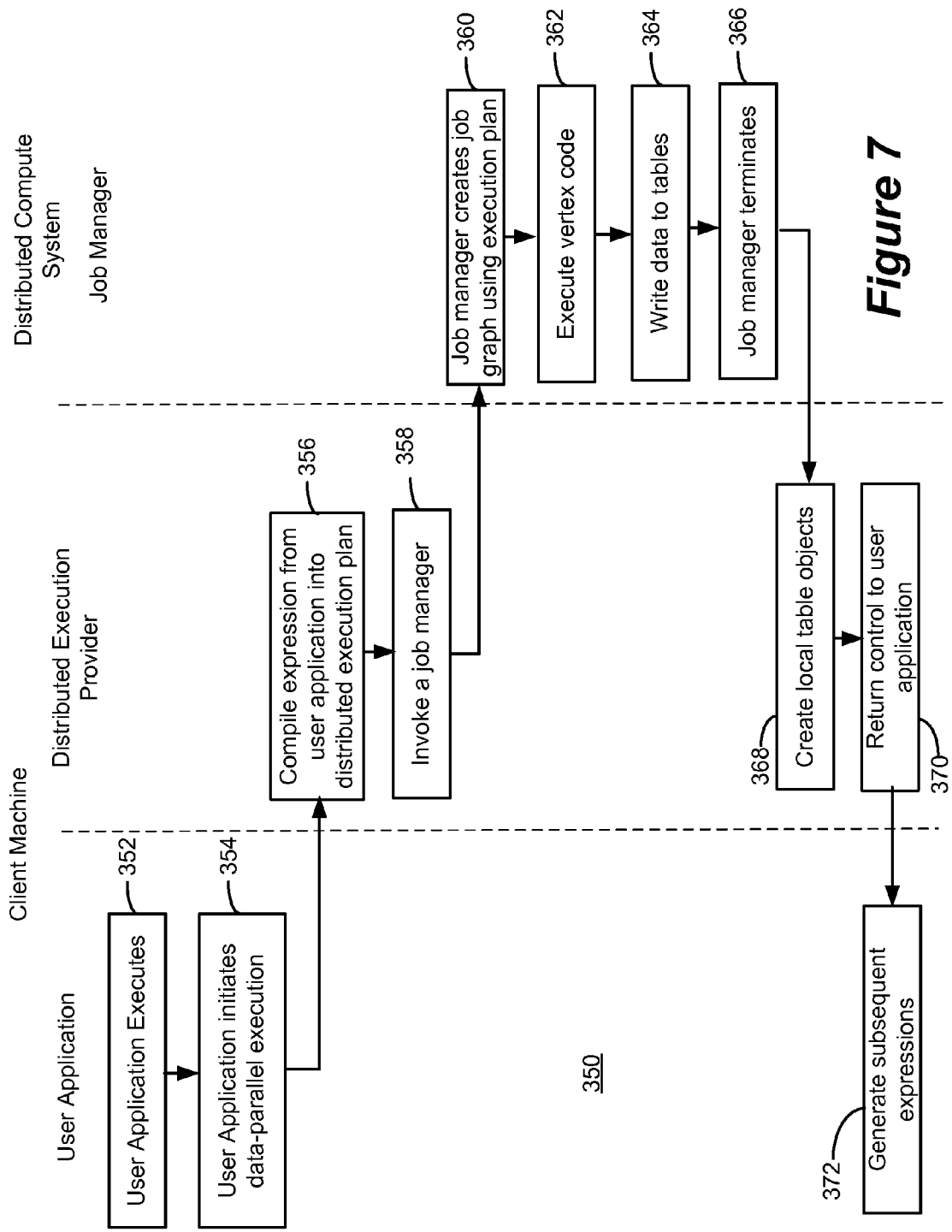

```
public IQueryable<TSource>
    HashPartition<TSource, TKey>(IQueryable<TSource> source,
                                 Expression<Func<TSource, TKey>> keySelector,
                                 IEqualityComparer<TKey> comparer,
                                 int count)
```
— 470

*Figure 11A*

```
public IQueryable<TSource>
    HashPartition<TSource, TKey>(IQueryable<TSource> source,
                                 Expression<Func<TSource, TKey>> keySelector,
                                 IEqualityComparer<TKey> comparer)
```
— 472

*Figure 11B*

```
public static IQueryable<TSource>
    RangePartition<TSource, TKey>(IQueryable<TSource> source,
                                  Expression<Func<TSource, TKey>> keySelector,
                                  TKey[] rangeKeys,
                                  IComparer<TKey> comparer)
```
— 474

*Figure 12A*

```
public static IQueryable<TSource>
    RangePartition<TSource, TKey>(IQueryable<TSource> source,
                                  Expression<Func<TSource, TKey>> keySelector,
                                  IComparer<TKey> comparer)
```
— 476

*Figure 12B*

```
public static IMultiQueryable<R1, R2>
   Fork<T, R1, R2>(IQueryable<T> source,
                   Expression<Func<IEnumerable<T>,
                                    IEnumerable<ForkTuple<R1, R2>>>> mapper)
```

*Figure 13A*

```
public static IMultiQueryable<R1, R2, R3>
   Fork<T, R1, R2, R3>(IQueryable<T> source,
        Expression<Func<IEnumerable<T>,
         IEnumerable, ForkTuple<R1, R2, R3>>>> mapper)
```

*Figure 13B*

```
public static IKeyedMultiQueryable<T, K>
   Fork<T, K>(IQueryable<T> source,
              Expression<Func<T, K> keySelector,
              K[] keys)
```

*Figure 13C*

```
var q = source.Fork(p => new ForkTuple<int, int>(p.x, p.y));
var q1 = q.First;
var q2 = q.Second;
```

*Figure 15*

```
public static IQueryable<T2>
  Apply<T1, T2>(IQueryable<T1> source,
              Expression<Func<IEnumerable<T1>, IEnumerable<T2>>> procFunc)
```

*Figure 16A*

```
public static IQueryable<T3>
  Apply<T1, T2, T3>(IQueryable<T1> source1,
                IQueryable<T2> source2,
                Expression<Func<IEnumerable<T1>,
                                IEnumerable<T2>,
                                IEnumerable<T3>>> procFunc)
```

*Figure 16B*

```
public static IEnumerable<double> SlidingAverage(IEnumerable<int> source)
{
   int[] window = new int[10];
   int i = 0;
   foreach (int x in source)
   {
      window[i] = x;
      i = (i + 1) % 10;
      yield return (window.Sum()/10.0);
   }
}
```

*Figure 16C*

```
[Homomorphic]
public static IEnumerable<int>
addeach(IEnumerable<int> left, IEnumerable<int> right)
{
        IEnumerator<int> left_enu = left.GetEnumerator();
        IEnumerator<int> right_enu = right.GetEnumerator();
        while (true)
        {
                bool more_left = left_enu.MoveNext();
                bool more_right = right_enu.MoveNext();
                if (more_left != more_right)
                {
                        throw new Exception("Streams with different lengths");
                }
                if (!more_left) yield break; // both are finished int l = left_enu.Current;
                int r = right_enu.Current;

int q = l + r;
                yield return q;
        }
}
```

*Figure 18A*

```
public static IQueryable<int>
AddStreams(IQueryable<int> left,
        IQueryable<int> right)
{
        return left.Apply<int, int, int>(right, (x,y) => addeach(x,y));
}
```

*Figure 18B*

```
public static IQueryable<T>
    ToLazyTable<T>(IQueryable<T> source, string filename)
```

Figure 20A

```
public static IDryadTable[] Materialize(IQueryable[] tables)
```

Figure 20B

```
var q = source.Fork(p => new ForkTuple<int, int>(p.x, p.y));

var q1 = q.First.ToLazyTable("result1");

var q2 = q.Second.ToLazyTable("result2");

IDryadTable[] results = Materialize(q1, q2);
```

Figure 20C

Figure 21A
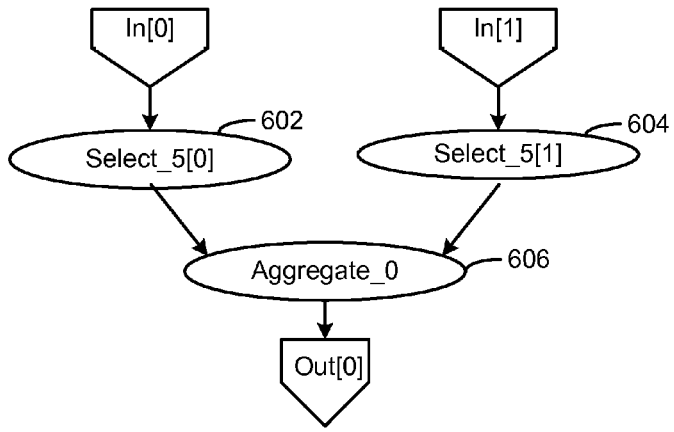
Figure 21B
Figure 22A
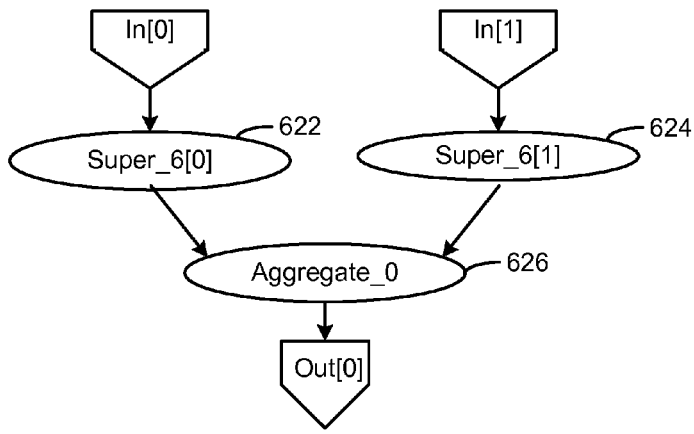
Figure 22B

```
source.Aggregate(0, (s, x) => CubeSum(s, x))

[Associative(Combiner="AddInt")]
  public static int CubeSum(int s, int x)
  {
     return s + x*x*x;
  }
```

*Figure 23*

```
public class Person
{
   public string name;
   [Field(CannotBeNull=true)]
   public string nickname;
}
```

*Figure 24*

```
public class Pair2
  {
     public Pair pair;
     [FieldMapping("p.x", "pair.x")]
     [FieldMapping("p.x", "pair.y")]
     public Pair2(Pair p)
     {
        this.pair.x = p.x;
        this.pair.y = p.x;
     }
  }
```

*Figure 25*

```
public void AssumeHashPartition<T, TKey>(IQueryable<T> source,
                                         Expression<Func<T, TKey>> keySelector,
                                         IEqualityComparer<TKey> comparer)
```

*Figure 26*

```
population.AssumeHashPartition(x => x.birthday, null);
var q = from people in population
        group people by people.birthday into g
        select g;
```

*Figure 27*

```
public void AssumeRangePartition<T, TKey>( IQueryable<T> source,
                                           Expression<Func<T, TKey>> keySelector,
                                           TKey[] rangeKeys,
                                           IComparer<TKey> comparer)
```

*Figure 28*

```
public void AssumeOrderBy<TKey>( IQueryable<T> source,
                                 Expression<Func<T, TKey>> keySelector,
                                 IComparer<TKey> comparer)
```

*Figure 29*

```
public void AssumeDistinct<T>( IQueryable<T> source, IEqualityComparer<T> comparer)
```

*Figure 30*

HIGH LEVEL PROGRAMMING EXTENSIONS FOR DISTRIBUTED DATA PARALLEL PROCESSING

BACKGROUND

One of the most challenging problems in the field of computing today is how to allow a wide variety of software developers to compute effectively on large amounts of data.

Parallel processing is one technique that has been employed for increasing the efficiency of computing on large amounts of data. Traditionally, parallel processing refers to the concept of speeding-up the execution of a program by dividing the program into multiple fragments that can execute concurrently, each on its own processor. A program being executed across n processors might execute n times faster than it would using a single processor. The terms concurrently and parallel are used to refer to the situation where the period for executing two or more processes overlap in time, even if they start and stop at different times. It is possible to perform parallel processing by connecting multiple computers in a network and distributing portions of the program to different computers on the network.

Many software application developers are not experienced with parallel processing. Therefore, it can be difficult for them to write an application that can take advantage of parallel processing. Moreover, it is often difficult to divide an application program in such a way that separate processors can execute different portions of a program without interfering with each other. There has been a great deal of research performed with respect to automatically discovering and exploiting parallelism in programs which were written to be sequential. The results of that prior research, however, have not been successful enough for most developers to efficiently take advantage of parallel processing in a cost effective manner.

SUMMARY

The described technology pertains to general-purpose distributed data-parallel computing using high-level computing languages. Data parallel portions of a sequential program that is written by a developer in a high-level language are automatically translated into a distributed execution plan. A set of extensions to the high-level computing language are provided that support distributed parallel computation and facilitate better generation and optimization of the distributed execution plan. By fully integrating the extensions into the programming language, developers can write sequential language programs using known constructs, but with the ability to invoke the extension to enable better generation and optimization of the execution plan for distributed computing. The extensions can include a set of unique operators that extend the sequential programming language to express distributed data-parallel computations. The extensions can further include a set of annotations that permit the attachment of attributes to classes, methods and fields. Additionally, the extensions can include a set of methods that allow a developer to assert various properties for datasets.

In one embodiment, an expression from a sequential application program that is executing on a first machine is accessed. The expression invokes at least one extension for distributed parallel processing by a distributed execution engine. An execution plan for parallel processing of the expression by the distributed execution engine using the at least one extension is automatically created. The execution plan is provided to the distributed execution engine for controlling parallel execution of the expression.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

FIG. 4 is a logical view of the system depicted in FIG. 1.

FIG. 7 depicts one embodiment of a process for executing data-parallel portions of the application program in a distributed compute system.

FIG. 8 is one embodiment of a process for compiling expressions from a user application into a distributed execution plan.

FIGS. 11A-11B are examples of hash-partitioning operator signatures in accordance with one embodiment.

FIGS. 12A-12B are examples of range-partitioning operator signatures in accordance with one embodiment.

FIGS. 13A-13C are examples of Fork operator signatures for dividing an input dataset into multiple datastreams in accordance with one embodiment.

FIG. 15 is pseudocode depicting one example of invoking an operator to divide an input dataset into multiple datastreams.

FIGS. 16A-16C are examples of Apply operator signatures for applying user-defined functions to datasets in a distributed data parallel processing system in accordance with one embodiment.

FIGS. 18A-18B depict pseudocode for one example of invoking an Apply operator for a user-defined function.

FIG. 20A is an example of an operator signature for deferring execution of a function by a distributed execution engine.

FIG. 20B is an example of an operator signature for causing the execution of functions subject to deferred execution using the operator of FIG. 20A.

FIG. 20C depicts pseudocode for one example of deferring execution of multiple expressions and later invoking the expressions for execution as a single job.

FIG. 21A depicts pseudocode for an example of an aggregate operation on a user-defined function that is not annotated as being associative.

FIG. 21B is an example of an execution plan graph for the pseudocode of FIG. 21A.

FIG. 22A depicts pseudocode for an aggregate operation on a user-defined function that is annotated as being associative.

FIG. 22B is an example of an execution plan graph for the pseudocode of FIG. 22A.

FIG. 23 depicts pseudocde for an aggregate operation on a user-defined function that is annotated as being associative with a combiner function.

FIG. 24 depicts pseudocde for one example of a field annotation.

FIG. 25 depicts pseudocde for one example of a fieldmapping annotation.

FIG. 26 is an example of a method signature for asserting a hashpartition property on a dataset.

FIG. 27 depicts pseudocode for one example of asserting a hashpartition property on a dataset.

FIG. 28 is an example of a method signature for asserting a rangepartition property on a dataset.

FIG. 29 is an example of a method signature for asserting an order by property on a dataset.

FIG. 30 is an example of a method signature for asserting a distinct property on a dataset.

DETAILED DESCRIPTION

Figure 1:
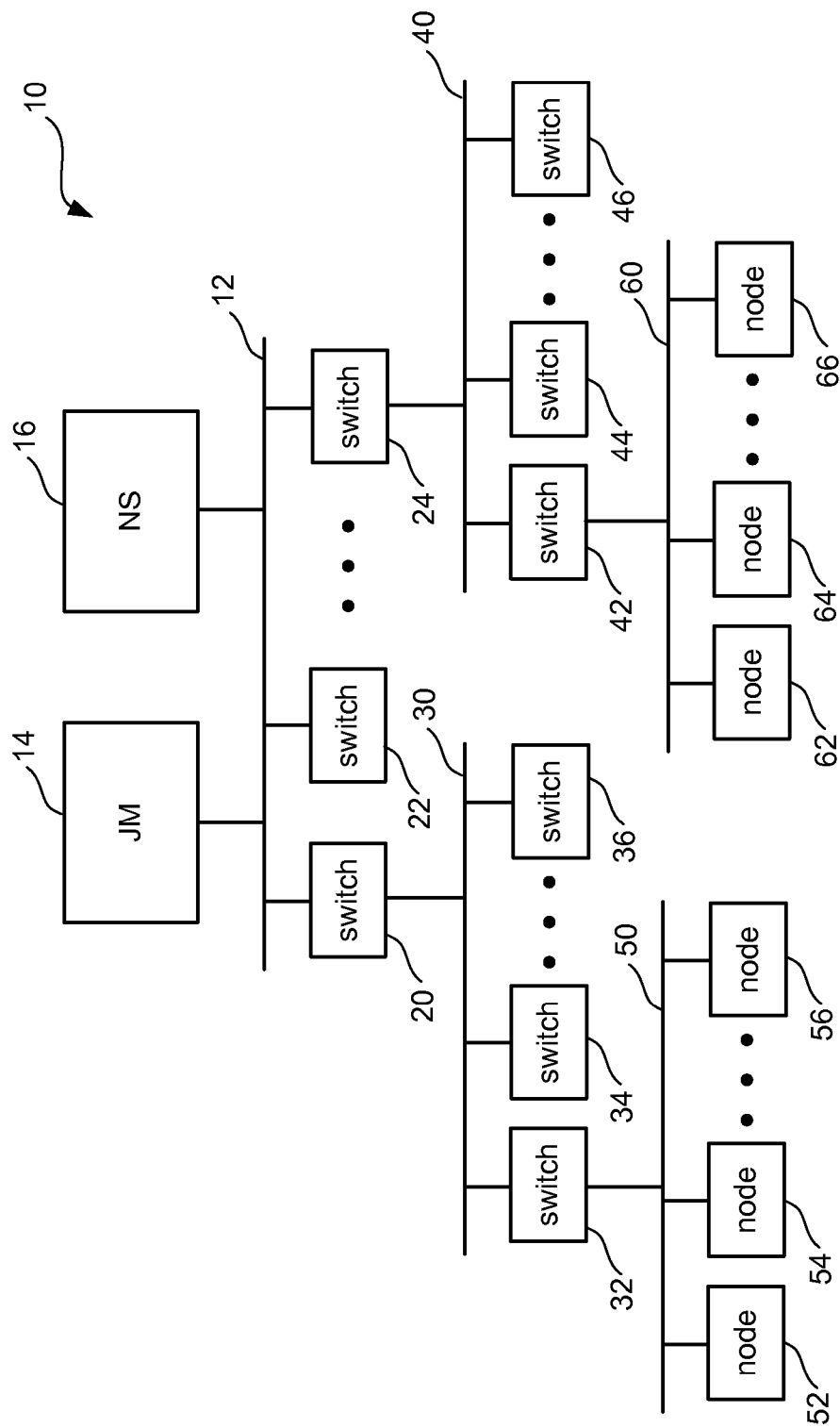
FIG. 1 is a block diagram of one embodiment of a distributed execution engine.

The disclosed technology pertains to general-purpose distributed data-parallel processing using high-level languages. Data-parallel portions of an application program are automatically translated into a distributed execution plan for processing by a distributed computing system that exploits the parallelism for more efficient computations. A developer can create a sequential program in a high level language ("application program"). The application program may be considered a hybrid program with code executing on a client machine and data-parallel portions suitable for execution in parallel at a distributed compute cluster. A distributed execution provider can automatically translate the data-parallel portions into the distributed execution plan. The distributed execution plan is then executed on nodes in a compute cluster.

A set of extensions to a high-level sequential programming language used to create user application programs is provided in one embodiment to improve support for and optimization of distributed-parallel computations. The extensions can be fully integrated into the programming language. In this manner, developers can write sequential language programs using known constructs, but with access to extensions that allow execution plans to be better optimized for execution in a distributed computing environment. The extensions have the appearance of normal sequential constructs such that a developer can invoke them in the same manner as standard operators in the native language of the application program.

A set of operators that extend a sequential programming language to express distributed data-parallel computations are provided in one embodiment. The operators fully integrate with the sequential programming language to appear to developers as sequential constructs. The developer can invoke these operators to cause the distributed execution provider to generate more efficient execution plans and to better optimize the plans once constructed. A set of annotations is provided in one embodiment that allows the developer to attach attributes to classes, methods and fields. These user-defined annotations enable the execution provider to develop better distributed execution plans. These annotations are useful in situations where the provider cannot determine information based on the semantics and properties of functions invoked by the high-level language operators. A set of methods is provided in one embodiment that facilitate the assertion of properties of a dataset by a developer. Like the annotations, these properties can be used by the execution provider to better develop and optimize execution plans for the distributed computing system.

In some embodiments, the distributed execution plan includes an execution plan graph ("EPG") and code for the vertices of the EPG ("vertex code"). The compiler may also serialize data objects that are referenced in the application program and needed for execution of the vertex code in the compute cluster. The serialized data objects may be considered to be part of the distributed execution plan. In some embodiments, the compiler generates additional code, such as code that is used to facilitate optimizing execution in the compute cluster.

In some embodiments, the overall system can be considered to be broken into three distinct pieces: 1) an application layer, 2) an execution engine, and 3) storage. The application layer includes both the application that the developer wrote and the compiler that automatically generates the distributed execution plan. The execution engine receives the execution plan and manages parallel execution in the compute cluster. The storage layer may include a database manager system (DBMS) for receiving queries. This separation may allow the application layer to interoperate with a variety of different types of execution engines, as well as a variety of different types of storage layers.

In some embodiments, the distributed execution provider provides the automatically generated distributed execution plan (e.g., EPG, vertex code, serialized data objects and serialization code) to an execution engine for execution in the compute cluster. Thus, the execution engine may be a separate program from the distributed execution provider that generated the distributed execution plan. FIG. 1 is a block diagram of an architecture for a suitable execution engine that is implemented as a tree-structure network 10 having various sub-networks within the tree-structure connected via switches. The execution engine can be used to cause the data-parallel portions of the application program to execute in the compute cluster. However, note that the data-parallel portions of the application program can be executed by a different execution engine than the example described herein. In other words, the code that is automatically generated (e.g., vertex code) can be executed by a different execution engine.

Sub-network 12 includes Job Manager 14 and Name Server 16. Sub-network 12 also includes a set of switches 20, 22, ..., 24. Each switch connects sub-network 12 with a different sub-network. For example, switch 20 is connected to sub-network 30 and switch 24 is connected to sub-network 40. Sub-network 30 includes a set of switches 32, 34, ..., 36. Sub-network 40 includes a set of switches 42, 44, ..., 46. Switch 32 is connected to sub-network 50. Switch 42 is connected to sub-network 60. Sub-network 50 includes a set of computing machines 52, 54, ..., 56. Sub-network 60 includes a set of computing machines 62, 64, ..., 66. Computing machines 52, 54, ..., 56 and 62, 64, ..., 66 (as well as other computing machines at the bottom levels of the hierarchy of the tree-structured network) make up the cluster of machines that form the distributed execution engine. Although FIG. 1 shows three levels of hierarchy, more or fewer than three levels can be used. In another embodiment the network may not be tree-structured, for example it could be arranged as a hypercube.

The automatically generated vertex code is executed as a parallel processing job (hereinafter referred to as a "job") that is coordinated by Job Manager 14, which is a process running on a dedicated computing machine or on one of the computing machines in the compute cluster. Job Manager 14 is responsible for instantiating a job's dataflow graph, scheduling processes on nodes in the compute cluster to cause the vertex code to execute, providing fault-tolerance by re-executing failed or slow processes, monitoring the job and collecting statistics, and transforming the job dataflow graph (or simply "job graph") dynamically based on callbacks in order to optimize execution. Name Server 16 is used to report the names (or other identification information such as IP Addresses) and position in the network of all of the computing machines in the cluster. There is a simple daemon (or service) running on each computing machine in the cluster which is responsible for creating processes on behalf of Job Manager 14.

Figure 2:
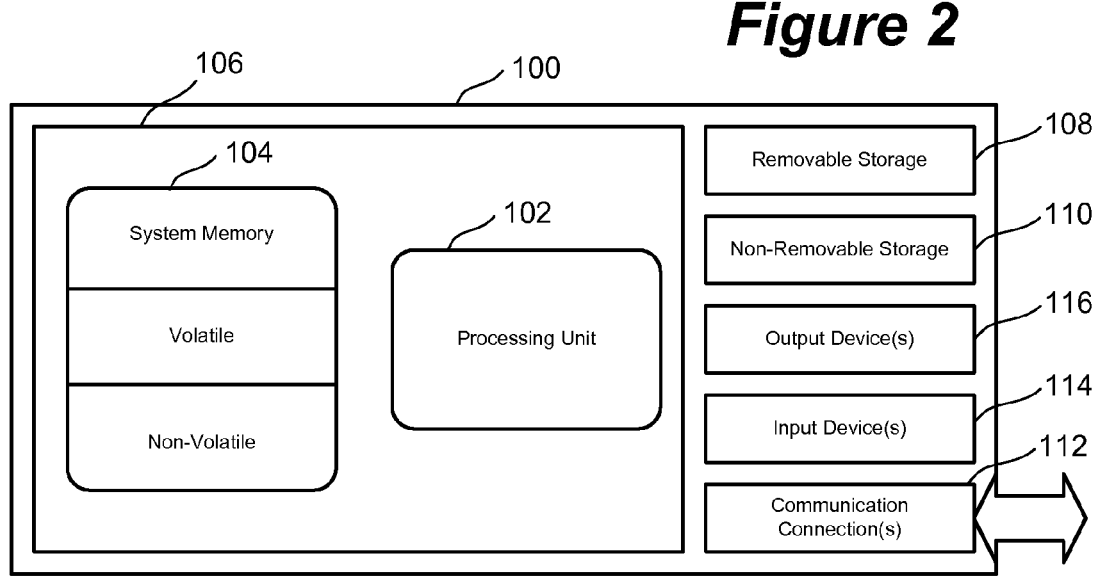
FIG. 2 is a block diagram of a computing machine that can be used to implement one embodiment of the nodes depicted in FIG. 1.

FIG. 2 depicts an exemplary computing device 100 for implementing the various computing machines of the cluster (e.g., machines 52, 54, . . . , 56 and 62, 64, . . . , 66), Job Manager 14 and/or Name Server 16. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. Processing unit 102 may be a single core, dual core or other form of multiple core processing unit. This most basic configuration is illustrated in FIG. 2 by line 106.

Additionally, device 100 may also have additional features/functionality. For example, device 100 may also include additional storage (removable and/or non-removable) including, but not limited to, magnetic disk, optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer (or processor) readable storage media. Such media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices via a wired or wireless network. Examples of communications connections include network cards for LAN connections, wireless networking cards, modems, etc.

Device 100 may also have input device(s) 114 such as keyboard, mouse, pen, voice input device, touch input device, etc. Output device(s) 116 such as a display/monitor, speakers, printer, etc. may also be included. All these devices (input, output, communication and storage) are in communication with the processor.

The technology described herein can be implemented using hardware, software, or a combination of both hardware and software. The software used is stored on one or more of the processor readable storage devices described above to program one or more of the processors to perform the functions described herein. In alternative embodiments, some or all of the software can be replaced by dedicated hardware including custom integrated circuits, gate arrays, FPGAs, PLDs, and special purpose computers.

Figure 3:
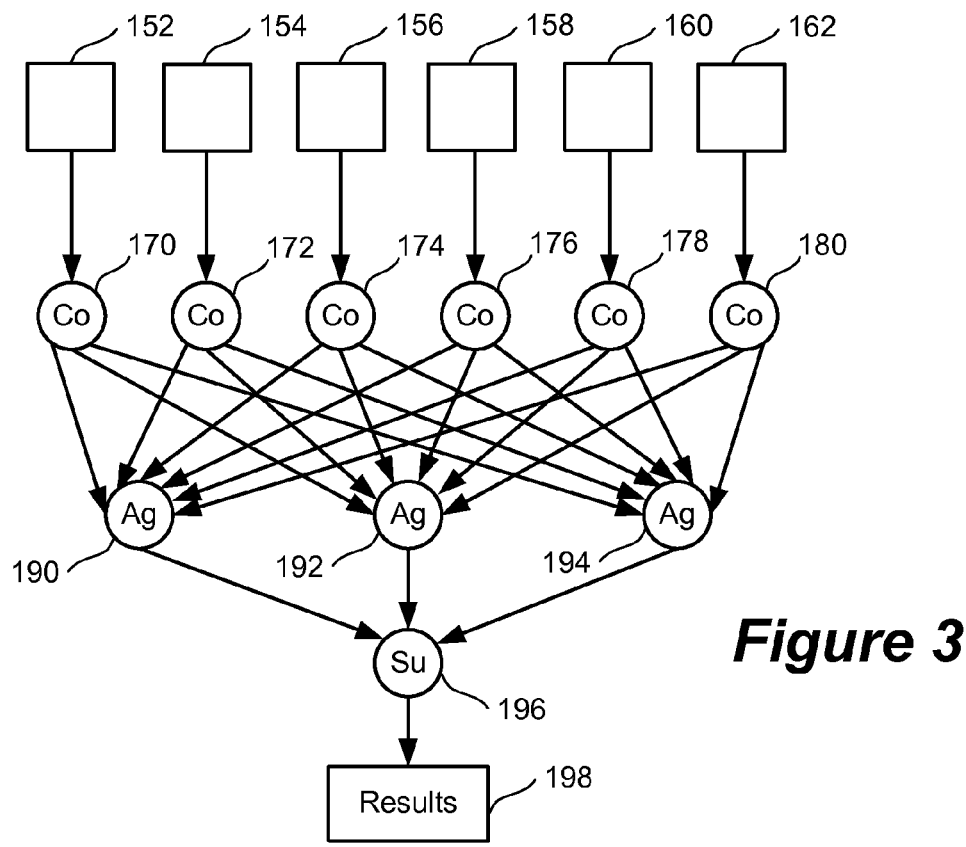
FIG. 3 is an example of a directed graph.

In some embodiments, a distributed execution provider analyzes portions of the user application and automatically generates a file that describes a directed graph (also referred to herein as an EPG) and code for vertices of the directed graph. As an example, the file that describes the directed graph could be an XML file. Job Manager 14 will build a job graph based on the file that describes the directed graph and manage the distribution of the vertex code to the various compute nodes of the distributed compute cluster. FIG. 3 provides one example of a block diagram of a directed graph that represents a system that reads query logs gathered by an Internet search service, extracts the query strings, and builds a histogram of query frequencies sorted by frequency. In the example of FIG. 3, the directed graph is acyclic; however, the directed graph could be cyclic.

In some embodiments, a job's external input and output files are represented as vertices in the graph even though they do not execute any program. Typically, for a large job, a single logical "input" is split into multiple partitions which are distributed across nodes in the system as separate files. Each of these partitions can be represented as a distinct input vertex. In some embodiments, there is a graph constructor which takes the name of a distributed file and returns a graph made from a sequence of its partitions. The application will interrogate its input graph to read the number of partitions at runtime in order to generate the appropriate replicated graph. For example, FIG. 3 shows six partitions or files 152, 154, 156, 158, 160 and 162 of the log created by the Internet search service.

The first level of the hierarchy of the graph of FIG. 3 includes vertex code (Co) for implementing vertices 170, 172, 174, 176, 178 and 180. Herein, the code for a particular vertex may also be referred to as a "vertex program" or simply a "vertex." As already stated, a distributed execution provider of some embodiments automatically generates this vertex code from expressions in the application program running on the client machine. The vertex code (Co) reads its part of the log files, parses the data to extract the query strings, sorts the query string based on a hash of the query string, and accumulates the total counts for each query string. Although eight vertices are shown (170, 172 . . . 180), more or fewer than eight vertices can be used. In one embodiment, there will be one vertex at this level for each partition of the log. Each of the vertices will output a set of hashes representing the query strings and a total count for each hash. This information will then be sent to an appropriate aggregator (Ag) vertex, depending on the hash.

FIG. 3 shows three vertices 190, 192 and 194 implementing the aggregator (Ag). The potential set of queries will be broken up into three buckets, with one subset of hashes being sent to aggregator 190, a second subset of hashes being sent to aggregator 192, and a third subset of hashes being sent to aggregator 194. In some implementations, there will be more or fewer than three aggregators. Each of the vertices 170-180 will be in communication with all of the aggregators to send data to the appropriate aggregator based on the hash. The aggregators 190, 192 and 194 will aggregate all of the counts for each query based on data received from vertices 170-180. Each of the aggregators 190, 192 and 194 will report its data to (Su) vertex 196, which will combine the sums for all of these various queries and store those sums in results file 198.

As can be seen, vertices 170-180 access data in parallel and can be executed in parallel. Similarly, aggregators 190-194 can also be executed in parallel. Thus, Job Manager 14 will distribute the vertex code to maximize efficiency for the system.

In one embodiment, a job utilizing the technology described herein has two levels of abstraction. At a first level of abstraction, the overall structure of the job is determined by the communication flow. This communication flow is the directed graph where each vertex is a process and edges represent data channels. In some embodiments, the directed graph is automatically generated based on analysis of the application program running on the client. The directed graph is automatically mapped onto physical resources by the execution engine. The second level of abstraction is the vertex code which implements the vertices.

In some embodiments, every vertex program deals with its input and output through the channel abstraction. As far as the body of vertex programs is concerned, channels transport objects. This ensures that the same vertex program is able to consume its input either from disk or when connected to a shared memory channel—the last case avoids serialization/deserialization overhead by passing the pointers to the objects directly between producer and consumer. Note that other channels implementations including, but not limited to, TCP pipes and HTTP connections are possible.

In some implementations, the base class for vertex programs supplies methods for reading any initialization parameters which were set during graph construction and transmitted as part of the vertex invocation. These include a list of string arguments and an opaque buffer into which the program may serialize arbitrary data. When a vertex program is first started but before any channels are opened, the runtime calls a virtual initialization method on the base class. This method receives arguments describing the number of input and output channels connected to it.

In one implementation, the input and output channels are opened before the vertex program starts. In another implementation channels are opened as needed, which requires fewer resources on the channel endpoint from which data originates and which may speed-up execution. In some cases, channels are opened in a random order to minimize resource contention. Any error at this stage causes the vertex program to report the failure and exit. This will trigger Job Manager 14 to try to recreate the missing input. In other embodiments, other schemes can be used. When all of the channels are opened, a vertex Main routine is called and passed channel readers and writers for all its inputs and outputs respectively. The readers and writers may have a blocking interface to read or write the next item which suffices for most simple applications. There may be a method on the base class for inputting status which can be read by the monitoring system, and the progress of channels may be automatically monitored. An error reporting interface allows that vertex program to communicate a formatted string along with any additional application-defined metadata. The vertex program may exit before reading all of its inputs. A process which contains a long pipeline of vertex programs connected via shared memory channels and ending, for example, with a "Head" vertex will propagate the early termination of Head all the way back to the start of the pipeline and exit without reading any unused portion of its inputs. In other embodiments, other schemes can be used.

FIG. 4 provides a logical view of the system depicted in FIG. 1 and how that system makes use of the vertex code 202. FIG. 4 shows Job Manager 14 connected to network system 230, which can be the network 10 of FIG. 1. Also connected to network system 230 are Name Service 16 and a set of computing machines 212, 214 and 216. Although FIG. 4 only shows three computing machines, it is possible to have fewer than three computing machines or more than three computing machines. In some embodiments there could be thousands of computing machines. Each computing machine has a process daemon (PD) running. Job Manager 14 will cause the various process daemons to run various vertices (e.g., vertices 222, 224, 226), which are in communication with the data plane 228. Data plane 228 is an arbitrary data transport mechanism used to implement channels (e.g., files, TCP pipes, or shared memory channels). Job Manager 14 includes vertex code 202, library 204, job graph 206, Vertex Queue 208, and Node Queue 210.

Library 204 provides a set of code to enable Job Manager 14 to create a job graph 206, build the job graph, and execute the job graph across the distributed execution engine. In one embodiment, library 204 can be embedded in C++ using a mixture of method calls and operator overloading. In one embodiment, library 204 defines a C++ base class from which all vertex programs inherit. Each such program has a textural name (which is unique within an application) and a static "factory" which knows how to construct it. A graph vertex may be created by calling the appropriate static program factory. Any required vertex-specific parameter can be set at this point by calling methods on the program object. The parameters are then marshaled along with the unique vertex name (referred to herein as a unique identification-UID) to form a simple closure which can be sent to a remote process or execution. Every vertex program is placed in a stage. In some implementations, a stage is created by replicating one vertex. In a large job, all the vertices in a level of hierarchy of the graph might live in the same stage; however, this is not required. In other embodiments, other schemes can be used.

The first time a vertex program is executed on a computer, its binary is sent from the Job Manager 14 to the appropriate process daemon (PD). The vertex program can be subsequently executed from a cache. In some embodiments, all vertices in a job share the same binary, which allows for efficient caching because vertex binaries sent for one stage can be reused by other stages. Job Manager 14 can communicate with the remote vertices, monitor the state of the computation, monitor how much data has been read, and monitor how much data has been written on its channels. Legacy executables can be supported as vertex programs by connecting the legacy executable with named pipes to a stub which redirects the data from the pipes to channels.

Job Manager 14 keeps track of the state and history of each vertex program in the job graph 206. A vertex program may be executed multiple times over the length of the job due to failures, and certain policies for fault tolerance. In one implementation, each execution of the vertex program has a version number and a corresponding execution record which contains the state of the execution and the versions of the predecessor vertices from which its inputs are derived. In one aspect, each execution names its file-based output channel uniquely using its version number to avoid conflicts when multiple versions execute simultaneously. In one implementation, each vertex executes in a separate isolated "sand-box." Therefore, multiple versions of the same vertex do not clash because each one uses a separate sand-box. One implementation of sandboxes is to use separate root directories. However, more complex implementations, based on virtual machines are possible. The sand-boxes may be managed by the process daemons. If the entire job completes successfully, then each vertex program selects one of its successful executions and renames the output files to their correct final forms.

When all of a vertex program's input channels become ready, a new execution record is created for the vertex program in the "Ready" state and gets placed in Vertex Queue 208. A disk based channel is considered to be ready when the entire file is present. A channel which is a TCP pipe or shared memory FIFO is ready when the predecessor vertex has at least one execution record in the "Running" state.

Each of the vertex's channels may specify a "hard constraint" or a "preference" listing the set of computing machines on which it would like to run. The constraints are attached to the execution record when it is added to Vertex Queue 208 and they allow the application writer to require that a vertex be collocated with a large input file, and in general that the Job Manager 14 preferentially run computations close to their data.

When a Ready execution record is paired with an available computer it transitions to the Running state (which may trigger vertices connected to its parent via pipes or FIFOs to create new Ready records). While an execution is in the Running state, Job Manager 14 receives periodic status updates from the vertex. On successful completion, the execution record enters the "Completed" state. If the vertex execution fails, the record enters the "Failed" state, which may cause failure to propagate to other vertices executing in the system. A vertex that has failed will be restarted according to a fault tolerance policy. If every vertex simultaneously has at least one Completed execution record, then the job is deemed to have completed successfully. If any vertex is reincarnated more than a set number of times, the entire job has failed.

Files representing temporary channels are stored in directories managed by the process daemon and are cleaned up after job completion. Similarly, vertices are killed by the process daemon if their parent job manager crashes.

Figure 5:
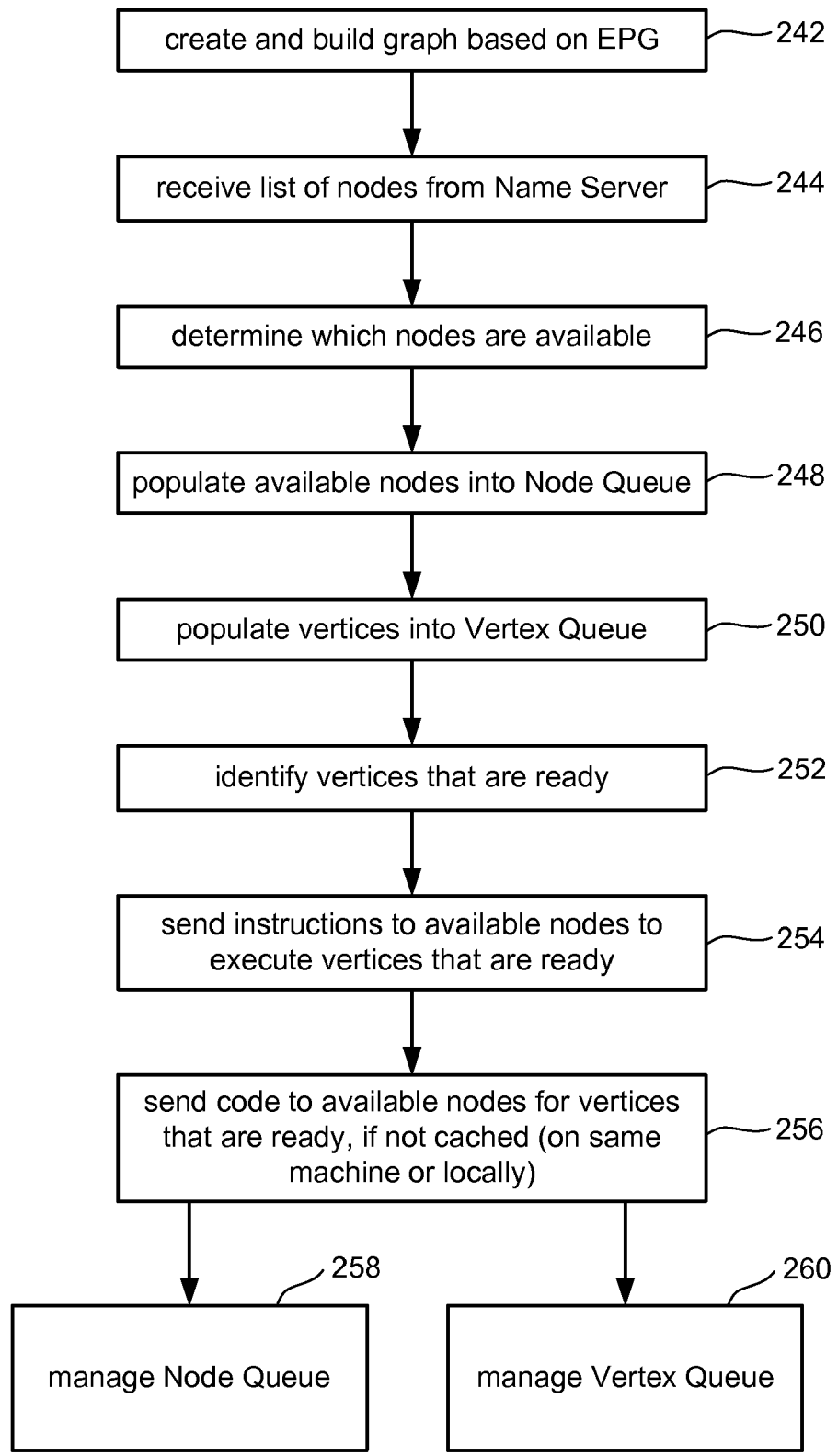
FIG. 5 depicts a flowchart describing one embodiment of a process performed by a job manager when executing code on the distributed execution engine of FIG. 1.

FIG. 5 depicts a flowchart describing one embodiment of a process performed by Job Manager 14 when executing vertex code 202 on the distributed execution engine of FIG. 1. In step 242, Job Manager 14 creates the job graph 206 based on the EPG and vertex code 208. In one embodiment, the EPG is a description of an execution plan, such as a description written in XML. Thus, Job Manager 14 may create the job graph 206 from an XML description.

In step 244, Job Manager 14 receives a list of nodes from Name Server 16. Name Server 16 provides Job Manager 14 with the name (or identification) of each node within the network as well as the position of each node within the tree-structured network. In many embodiments, a node is a computing machine. In some embodiments, a computing machine may have more than one node.

In step 246, Job Manager 14 determines which of the nodes are available. A node is available if it is ready to accept another program (associated with a vertex) to execute. In one implementation, Job Manager 14 queries each process daemon to see whether it is available to execute a program. In one implementation, Job Manager 14 assumes that all machines listed by the NS are available. If Job Manager 14 cannot connect to a PD (or if a PD fails to often), then Job Manager 14 marks the PD as unusable. Job Manager 14 may dispatch several copies of each vertex to a set of process daemons chosen according to a scheduling algorithm. In step 248, Job Manager 14 populates all of the available nodes into Node Queue 210. In step 250, Job Manager 14 places all the vertices that need to be executed into Vertex Queue 208. In step 252, Job Manager 14 determines which of the vertices in Vertex Queue 208 are ready to execute. In one embodiment, a vertex is ready to execute if all of its inputs are available.

In step 254, Job Manager 14 sends instructions to the process daemons of the available nodes to execute the vertices that are ready to be executed. Job Manager 14 pairs the vertices that are ready with nodes that are available, and sends instructions to the appropriate nodes to execute the appropriate vertex. In step 256, Job Manager 14 sends the code for the vertex to the node that will be running the vertex code, if that code is not already cached on the same machine or on another machine that is local (e.g., in same sub-network). In most cases, the first time a vertex is executed on a node, its binary will be sent to that node. After executing the binary, that binary will be cached. Thus, future executions of that same code need not be transmitted again. Additionally, if another machine on the same sub-network has the code cached, then the node tasked to run the code could get the program code for the vertex directly from the other machine on the same sub-network rather than from Job Manager 14. After the instructions and code are provided to the available nodes to execute the first set of vertexes, Job Manager 14 manages Node Queue 210 in step 258 and concurrently manages Vertex Queue 208 in step 260.

Managing node queue 258 includes communicating with the various process daemons to determine when there are process daemons available for execution. Node Queue 210 includes a list (identification and location) of process daemons that are available for execution. Based on location and availability, Job Manager 14 will select one or more nodes to execute the next set of vertices. Steps 252-256 may be repeated until all vertices have been run.

Further details of execution engines can be found in U.S. Published Patent Application 2008/0082644, entitled "Distributed Parallel Computing;" U.S. Published Patent Application 2008/0098375, entitled "Runtime Optimization of Distributed Execution Graph;" and U.S. Published Patent Application 2008/0079724, entitled "Description Language for Structured Graphs;" all of which are all hereby incorporated by reference for all purposes.

Figure 6:
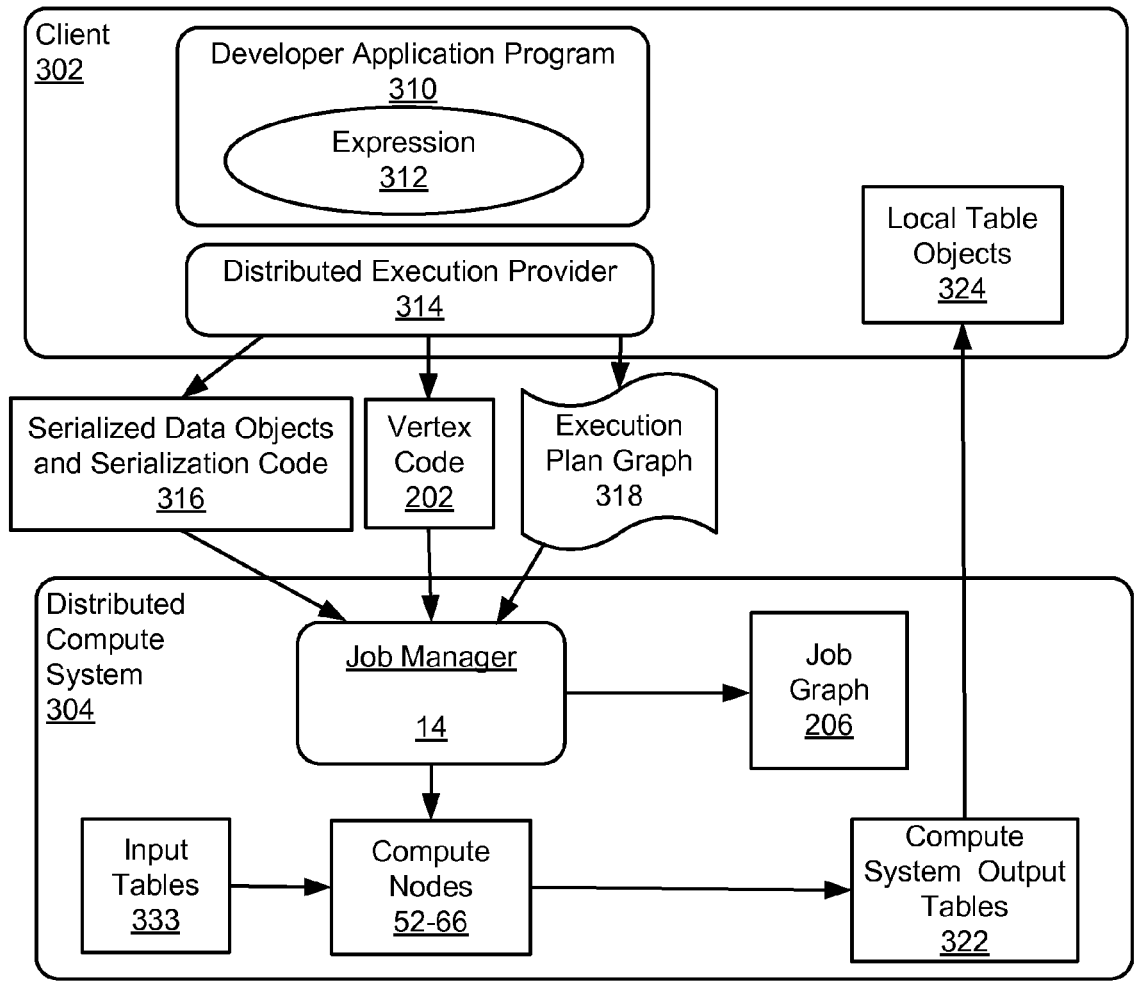
FIG. 6 depicts one embodiment of software and data structures used for data-parallel processing.

FIG. 6 depicts one embodiment of software and data structures used for data-parallel processing. In general, FIG. 6 depicts a client machine 302 and a distributed compute system 304. The client machine 302 may be implemented with computer device 100 depicted in FIG. 2. The client 302 is running an application program 310 and a distributed execution provider 314 that extracts expressions 312 (or expression trees) from the application program 310. Based on the expressions 312, the distributed execution provider 314 generates an execution plan graph ("EPG") 318, vertex code 202, and serialized data objects and serialization code 316, which are each provided to the distributed compute system 304. In this example, Job Manager 14 distributes the vertex code 202 and serialized objects and serialization code 316 to compute nodes 52-66. In one embodiment, the client machine 302 can form part of the distributed compute system 304.

Note that the application program 310 may be a sequential program that has code that executes on the client 302 in addition to the data-parallel portions that execute in the distributed compute system 304. For example, the data-parallel code might perform a page-rank of web pages, whereas the code that executes on the client 302 might present the page rank statistics to a user in a graphical user interface. Thus, the application program 310 may be thought of as a "hybrid" program. Note that in some conventional systems two separate programs would need to be written to accomplish what application program 310 performs. For example, a first program might be written in a language such as SQL to perform database queries and second program might be written in a language such as C to perform functions at the client device.

Moreover, in some embodiments, the developer does not need to be concerned over which variables are local to the client 302 and which are remote because the distributed execution provider 314 takes care of this.

The application program 310 may have both declarative and imperative operations. The application program 310 may include traditional structuring constructs such as functions, modules, and libraries, and express iteration using standard loops. In some embodiments, the distributed execution plan employs a fully functional, declarative description of the data-parallel components, which enables sophisticated rewritings and optimizations such as those traditionally employed by parallel databases.

In one implementation, the application program 310 is written in the LINQ (Language INtegrated Queries) programming language. A LINQ program is a sequential program composed of LINQ expressions. A LINQ program is a Microsoft .NET Framework component that adds native data querying capabilities to .NET languages. The .NET framework is a software framework that is available with several Windows® operating systems that are available from Microsoft corporation of Redmond, Wash. A LINQ program can be debugged using standard .NET development tools. The application program 310 is not limited to LINQ nor is it limited to the .NET Framework.

FIG. 7 depicts one embodiment of a process 350 for executing data-parallel portions of the application program 310 in a distributed compute system 304. FIG. 6 will be referred to when discussed the process 350. In step 352, a user application 310 executes on the client machine 302. In one embodiment, the user application 310 is written by the developer in a high level language. In one embodiment, the application program 310 creates one or more expressions 312 during runtime. However, the actual execution of the expression 312 may be deferred until later in the process 350.

In one implementation, the expression 312 is based on classes provided by a .NET library. In one aspect, the expression 312 is base on .NET "Expression" classes. A .NET Expression class is in the namespace System.Linq.Expression. There are numerous subclasses, such as BinaryExpression, ConstantExpression, UnaryExpression, LambdaExpression, MemberAssignment, etc. For example, an expression 312 may be implemented as a tree of expression classes with each node in the tree being an operator. Child nodes may show inputs to operators. As a specific example, the addition of two constants may be represented as a tree with a root of "BinaryExpression" and two leaf nodes containing the constant expressions. Thus, as previously discussed an expression 312 might also be referred to as an expression tree.

In step 354, the user application 310 initiates data parallel execution, which may result the expression 312 being passed to the distributed execution provider 314. In one aspect, the user application 310 makes a call in order to initiate data parallel execution. However, it is not required that the user application 310 make call to initiate data parallel execution. In one aspect, data parallel execution is initiated in response to the user application 310 attempting to enumerate a value for an expression 312. When the user application 310 attempts to enumerate a value for the expression 312, data parallel execution is initiated to compute the value.

In step 356, the distributed execution provider 314 compiles the expression 312 into a distributed execution plan 318. Step 356 may include the decomposition of the expression 312 into sub-expressions. Each sub-expression corresponds to a vertex. Step 356 may also include the automatic generation of the vertex code, as well as static data for the vertices. Further, serialization code may be automatically generated for the data types needed to execute at the remote computer nodes.

As previously discussed, in some implementations, the expressions 312 are based on the Expression class of a .NET library. In one aspect, the distributed execution provider 314 manipulates and transforms the expression 312 and breaks it into pieces. In one aspect, each piece is used to generate C# code, which is the vertex code 202. Note that data structures represented by the expressions 312 may be similar to syntax trees that are used by compilers to represent the code during the compilation process.

In step 358, the distributed execution provider 314 invokes a Job Manager 14. In one embodiment, the Job Manager 14 executes behind a firewall. In step 360, Job Manager 14 creates a job graph 206 using the distributed execution plan 318 that was generated in step 354. Job Manager 14 schedules and spawns the vertices as resources become available in the distributed compute system 304. In step 362, each of the vertices executes the code 202 that was generated in step 354. The compute nodes have access to input tables 333 to make computations. The input tables 333 are data being processed by the user application 310. Some of the input tables 333 datasets can be based on the result of a previous computation performed by the distributed compute system 304 for the user application 310. The datasets in the input tables 333 can also be based on some other external computation. Note that the input tables 333 may be composed of partitions that reside on different machines and that each partition can have replicas on different machines. In step 364, the job completes and the results are output to the distributed compute system output tables 322.

In step 366, Job Manager 14 terminates, returning control back to the distributed execution provider 314. In step 368, the distributed execution provider 314 creates local table objects 324 encapsulating the output of execution in the distributed compute system 304. These local objects 324 may then be used as inputs to subsequent expressions 312 in the user application program 310. In one implementation, local table objects 324 are fetched to the local context only if explicitly de-referenced.

In step 370, control returns to the user application program 310. The user application 310 has access to the local table objects 324. In one implementation, an iterator interface allows the user application 310 to read the local table objects 324 as .NET objects. However, there is no requirement of using .NET objects.

In step 372, the application program 310 may generate subsequent expressions 312, which may be executed by repeating steps 352-370.

FIG. 8 is one embodiment of a process 400 for compiling an expression 312 from a user application 310 into a distributed execution plan. Process 400 is one implementation of step 356 of process 350. In step 402, an execution plan graph (EPG) is generated from an expression 312. Step 402 occurs when the distributed execution provider 314 receives control after the application program 310 initiates parallel processing. The distributed execution provider 314 converts the raw expression 312 into an execution plan graph (EPG) 318, where each vertex is an operator and edges represent its inputs and outputs. The EPG 318 may be related to a conventional database query plan; however, the EPG may encompass computations that are not easily formulated as "queries." The EPG may be a directed graph, which may or may not be acyclic. The existence of common sub-expressions and operators like "Fork" means that EPGs cannot always be described by trees. In some implementations, the EPG is a "skeleton" that is written in a language such as XML. For example, the EPG may be a skeleton of the job data-flow graph 206 that will be executed by the execution engine.

In step 404, static optimizations of the EPG 318 are performed. In one implementation, the distributed execution provider 314 applies term-rewriting optimizations on the EPG 318. In one embodiment, each EPG node is replicated at run time to generate a "stage," which may be defined as a collection of vertices running the same computation on different partitions of a dataset. In one implementation, the optimizer annotates the EPG 318 with metadata properties. For edges of the EPG 318, these annotations may include the data type and the compression scheme, if any, used after serialization. In one implementation, the data types are .NET data types. For nodes of the EPG 318, the annotations may include details of the partitioning scheme used, and ordering information within each partition. The output of a node, for example, might be a dataset that is hash-partitioned by a particular key, and sorted according to that key within each partition. This information can be used by subsequent OrderBy nodes to choose an appropriate distributed sort algorithm. In one aspect, the properties are seeded from the LINQ expression tree and the input and output tables' metadata, and propagated and updated during EPG rewriting.

Propagating these properties may be more difficult than for a conventional database. The difficulties stem from the much richer data model and expression language used to create the application program 310. Consider one of the simplest operations: input.Select(x=>f(x)). If f is a simple expression, e.g. x.name, then it is straightforward for the distributed execution provider 314 to determine which properties can be propagated. However, for arbitrary f it is very difficult to determine whether this transformation preserves the partitioning properties of the input.

The distributed execution provider 314 can usually infer properties in the application programs 310 typical users write. Partition and sort key properties are stored as expressions, and it is often feasible to compare these for equality using a combination of static typing, static analysis, and reflection. In one embodiment, a simple mechanism is provided that allows users to assert properties of an expression 312 when it is difficult or impossible to determine the properties automatically. Further details of static optimizations are discussed below.

In step 406, the vertex code 202 and static data for the vertices are generated. While the EPG 318 encodes all the required information, it is not necessarily a runnable program. In one embodiment, dynamic code generation automatically synthesizes LINQ code to be run at the vertices. The generated code may be compiled into a .NET assembly that is shipped to cluster computers at execution time. The subexpression in a vertex may be built from pieces of the overall EPG 318. In some implementations, the EPG 318 is created in the original client computer's execution context, and may depend on this context in two ways: (1) The expression 312 may reference variables in the local context. These references are eliminated by partial evaluation of the sub-expression at code-generation time. For primitive values, the references in the expressions 312 may be replaced with the actual values. Object values are serialized to a resource file which is shipped to computers in the cluster at execution time. (2) The expression 312 may reference .NET libraries. In this case, .NET reflection may be used to find the transitive closure of all non-system libraries referenced by the executable, which are shipped to the cluster computers at execution time.

In step 408, serialized objects and serialization code 316 are generated for required data types. As previously mentioned, the user application 310 can be thought of as a hybrid program that has code for executing at the client 302 and code that is executed in parallel in the distributed compute system 304. It may be that the user application 310 refers to a local data object that is needed by the vertex code 202. The serialization code may be bundled with the vertex code 202 and shipped to compute nodes. The serialization code allows the compute nodes to read and write objects having the required data types. The serialized objects are provided to the vertices because the vertex code 202 references those objects. Note that the developer is not required to declare which data is local and which data is remote. The serialization code 316 allows data to be passed in the channels between the vertices. This serialization code 316 can be much more efficient than standard .NET serialization methods since it can rely on the contract between the reader and writer of a channel to access the same statically known datatype.

In step 410, the distributed execution provider 314 generates code for performing dynamic optimizations. Generating code for dynamic optimization is discussed below.

In various embodiments, the distributed execution provider 314 performs both static and dynamic optimizations. The static optimizations may be greedy heuristics or cost-based optimizations. The dynamic optimizations are applied during job execution and may consist in rewriting the job graph depending on run-time data statistics. In various implementations, the optimizations are sound in that a failure to compute properties simply results in an inefficient, though correct, execution plan.

In one embodiment, the static optimizations are conditional graph rewriting rules triggered by a predicate on EPG node properties. Static optimizations may be focused on minimizing disk and network I/O. Some important optimizations include the following. However, many other types of optimizations can be performed.

Pipelining: Multiple operators may be executed in a single process. The pipelined processes may themselves be expressions 312 and can be executed by an existing single-computer LINQ implementation.

Removing redundancy: The distributed execution provider 314 removes unnecessary hash- or range-partitioning steps.

Eager Aggregation: Since re-partitioning datasets is expensive, down-stream aggregations are moved in front of partitioning operators where possible.

I/O reduction: Where possible, the distributed execution provider 314 takes advantage of TCP-pipe and in-memory FIFO channels instead of persisting temporary data to files. In one embodiment, data is by default compressed before performing a partitioning in order to reduce network traffic. Users are allowed to manually override compression settings to balance CPU usage with network load if the optimizer makes a poor decision.

In one embodiment, API hooks are used to dynamically mutate the job graph 356 as information from the running job becomes available. For example, the distributed execution provider 314 provides "callback code" to Job Manager 14. This callback code is added to the job graph 206. During runtime, this callback code causes information to be gathered and used to dynamically mutate the job graph 206. The callback code may also perform the dynamic optimizations based on the gathered information.

In one implementation, the mutation is based on aggregation. Aggregation gives a major opportunity for I/O reduction since it can be optimized into a tree according to locality. Data may be aggregated first at the computer level, next at the rack level, and finally at the cluster level. The topology of such an aggregation tree can only be computed at run time, since it is dependent on the dynamic scheduling decisions which allocate vertices to computers. The distributed execution provider 314 may use techniques discussed in U.S. Published Patent Application 2008/0098375, entitled "Runtime Optimization of Distributed Execution Graph, which has already been incorporated herein by reference in its entirety.

In one embodiment, dynamic data partitioning is used. Dynamic data partitioning sets the number of vertices in each stage (i.e., the number of partitions of each dataset) at run time based on the size of its input data. Conventional databases usually estimate dataset sizes statically, but these estimates can be very inaccurate. As one example, the estimates may be inaccurate in the presence of correlated queries. In one embodiment, dynamic hash and range partitions are supported. For range partitions both the number of partitions and the partitioning key ranges are determined at run time by sampling the input dataset.

Figure 9:
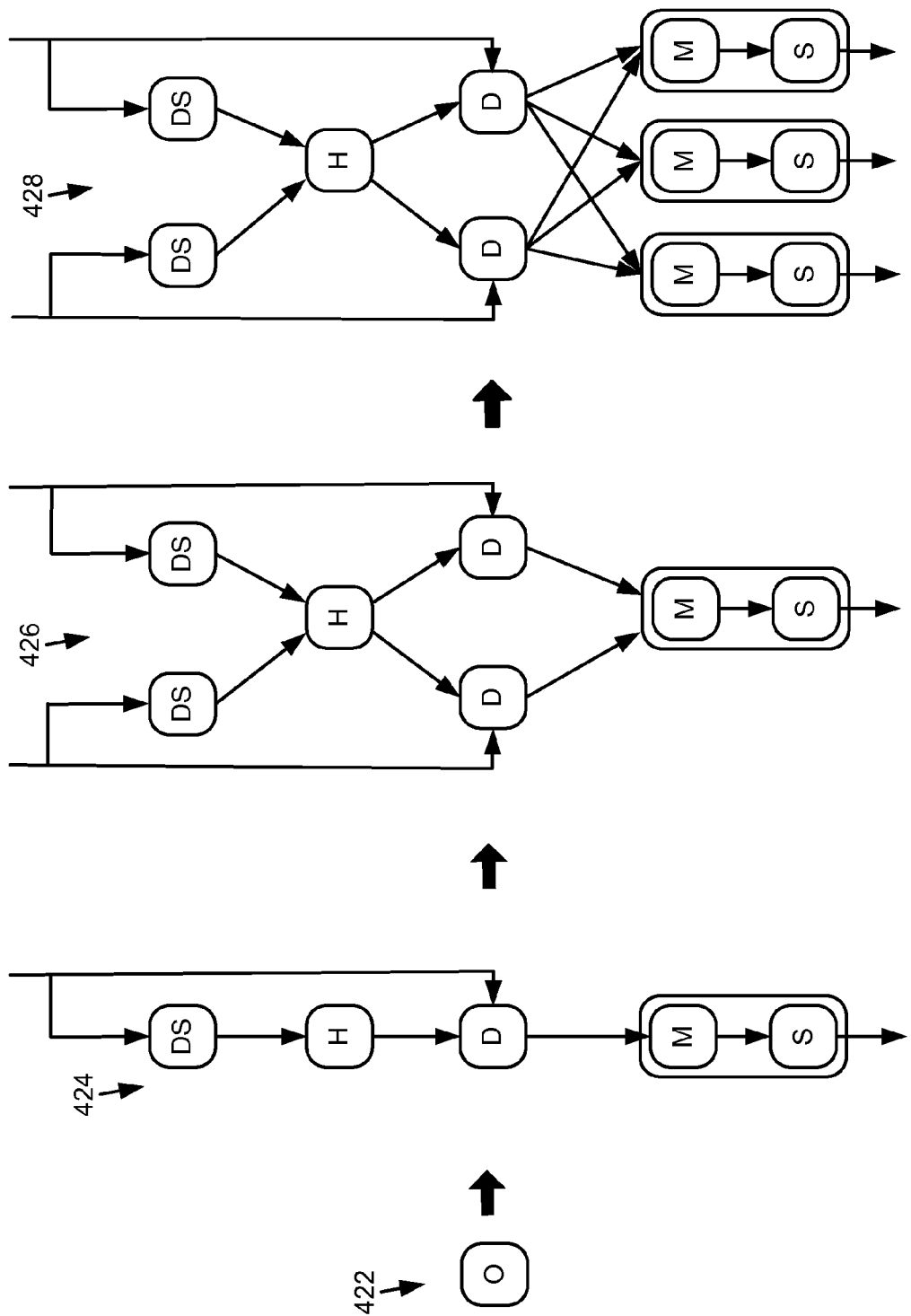
FIG. 9 depicts one embodiment of static and dynamic optimizations of a graph.

The following example for sorting a dataset d illustrates many of the static and dynamic optimizations available. Different strategies are adopted depending on d's initial partitioning and ordering. FIG. 9 shows the evolution of an OrderBy node O 422 in a complex case, where d is not already range-partitioned by the correct sort key, nor are its partitions individually ordered by the key. The transformation of OrderBy node O 422 to graph 424 is static. The transformation of graph 424 to graph 426 and then graph 426 to graph 428 are both dynamic, based on information learned at runtime.

Referring now to graph 424, first the dataset is re-partitioned. The DS stage performs deterministic sampling of the input dataset. The samples are aggregated by a histogram vertex H, which determines the partition keys as a function of data distribution (load-balancing the computation in the next stage). The D vertices perform the actual repartitioning, based on the key ranges computed by H. Next, a merge node M interleaves the inputs, and a S node sorts them. M and S are pipelined in a single process, and communicate using iterators.

The number of partitions in the DS+H+D stages of graph 426 is chosen at run time based on the number of partitions in the preceding computation. The number of partitions in the M+S stages of graph 428 is chosen based on the volume of data to be sorted.

As previously discussed, some embodiments use the LINQ framework. One of the benefits of using the LINQ framework is that other systems that use the same or similar constructs can be leveraged. For example, PLINQ, which allows code to be run within each vertex in parallel on a multi-core server, can be leveraged. PLINQ is described in, "A Query Language for Data Parallel Programming," J. Duffy, Proceedings of the 2007 Workshop on Declarative Aspects of Multicore Programming, 2007, which is hereby incorporated by reference for all purposes. PLINQ attempts to make the process of parallelizing a LINQ program as transparent as possible. PLINQ employs the iterator model since it is better suited to fine-grain concurrency in a shared-memory multi-processor system. Because both PLINQ and certain embodiments of the disclosure use expressions composed from the same LINQ constructs, their functionality may be combined. In some embodiments, vertices execute LINQ expressions, and in general the addition by the code generator of some embodiments of a single line to the vertex's program triggers the use of PLINQ, allowing the vertex to exploit all the cores in a cluster computer.

In some implementations, interoperation with a LINQ-to-SQL system allows vertices to directly access data stored in SQL databases. Running a database on each cluster computer and storing tables partitioned across these databases may be much more efficient than using flat disk files for some applications. Application programs 310 can use "partitioned" SQL tables as input and output in some embodiments. The distributed execution provider 314 of some embodiments identifies and ships some subexpressions to the SQL databases for more efficient execution.

Further, a single-computer LINQ-to-Objects implementation allows applications programs 310 to be run on a single computer for testing on small inputs under the control of a debugger before executing on a full cluster dataset. In one implementation, the debugger is a part of the Visual Studio® development system, which is available from Microsoft Corporation of Redmond, Wash. Debugging a distributed application is a notoriously difficult problem. Distributed application jobs may be long running, processing massive datasets on large clusters, which could make the debugging process even more challenging. One embodiment is a mechanism to run applications on a single computer with very sophisticated support from the .NET development environment. Once an application is running on the cluster, an individual vertex may fail due to unusual input data that manifests problems not apparent from a single-computer test. One aspect uses a deterministic-replay execution model, which allows re-execution of such a vertex in isolation with the inputs that caused the failure, and the system includes scripts to ship the vertex executable, along with the problematic partitions, to a local computer for analysis and debugging.

Performance debugging is a much more challenging problem. In some embodiments, programs report summary information about their overall progress. However, if particular stages of the computation run more slowly than expected, or their running time shows surprisingly high variance, it may be necessary to investigate a collection of disparate logs to diagnose the issue manually. The centralized nature of the job manager makes it straightforward to collect profiling information to ease this task.

A set of extensions to the high-level sequential programming language used to create user application programs is provided in one embodiment to improve support for distributed-parallel computations in the distributed execution engine 10. The extensions can be fully integrated into the programming language. In this manner, developers can write sequential language programs using known constructs, but also have access to extensions that allow execution plans to be better optimized for execution in a distributed computing environment. The extensions have the appearance of a normal sequential construct such that a developer can invoke them in the same manner as standard operators in the native language of the application program.

The set of extensions includes a set of operators for extending a sequential programming language to express distributed data-parallel computations in one embodiment. A developer can invoke these operators to cause the distributed execution provider to generate more efficient execution plans and to better optimize the plans once constructed. The set of extensions can also include a set of annotations that allows a developer to attach attributes to classes, methods and fields that will enable the execution provider to develop better distributed execution plans. These annotations are useful in situations where the provider cannot determine information based on the semantics and properties of functions invoked by the high-level language operators. The set of extension can further include a set of methods that facilitates the assertion of properties of a dataset by a developer. Like the annotations, these properties can be used by the execution provider to better develop and optimize execution plans for the distributed computing system.

Data Partitioning Operators

One or more data partitioning operators are provided in one embodiment that provide a developer various degrees of control over the partitioning of input files or datasets within the distributed, data-parallel computing system. As earlier described, the distributed execution provider 314 may specify partitioning of input files or datasets from the serialized data objects 316 as part of the execution plan graph. This partitioning is performed automatically by the execution provider to develop a distributed execution plan. These individual partitions of a dataset are distributed to the appropriate nodes for use when executing vertex code 202.

Figure 10:
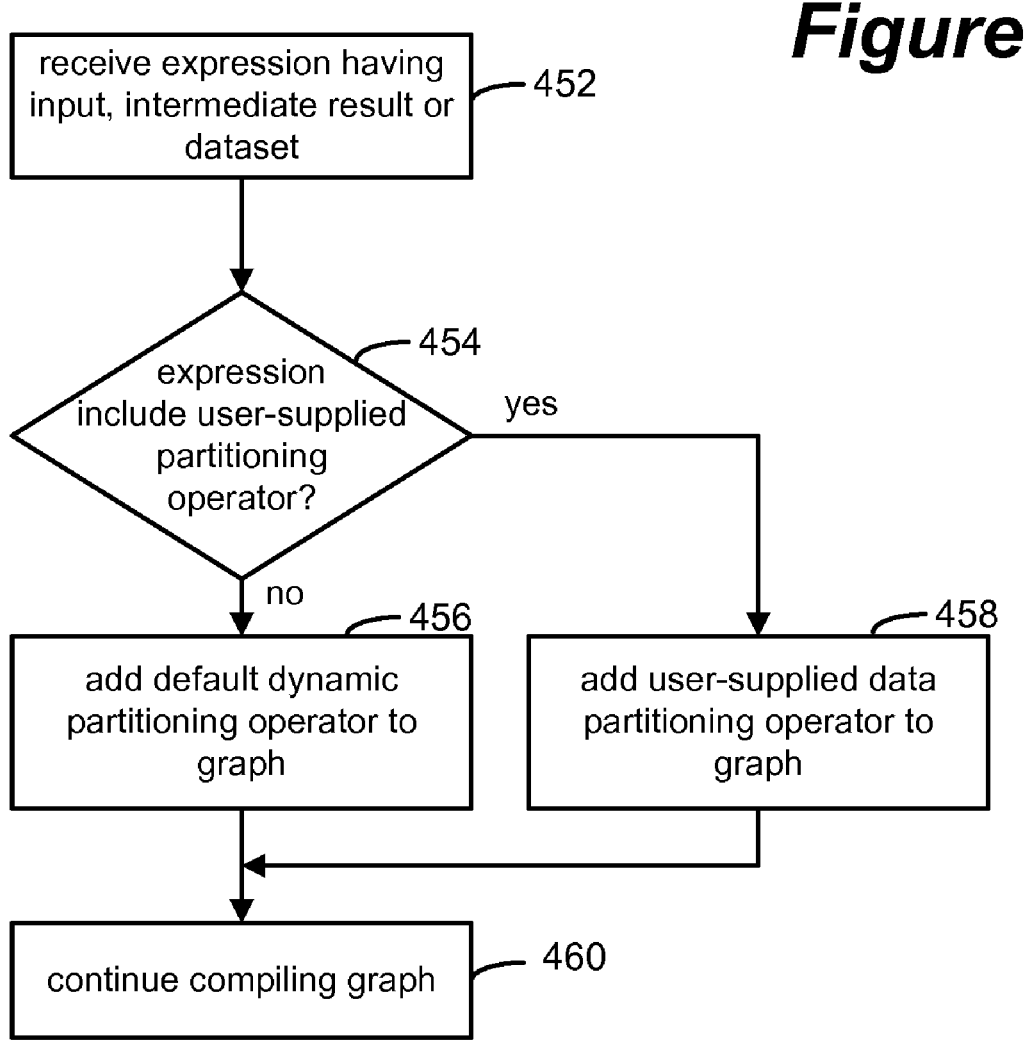
FIG. 10 is a flowchart describing the automatic generation of an execution plan including the specification of user-defined data partitioning.

In one example, the data partitioning operators are invoked by a developer to override the default partitioning applied by the execution provider and to enforce a partitioning on an output dataset. From the perspective of the sequential application program, the partitioning operators are generally no-ops (no-operation) since they reorganize a collection without changing its contents. FIG. 10 is a flowchart describing a process performed by the compiler to process user-supplied partitioning operators in one embodiment. The process can be used at step 402 of FIG. 8 in one example to build portions of execution plan graph 318. At step 452, the execution provider 314 receives an expression object 312 from the developer application program that operates on an input, intermediate result or dataset that is suitable for partitioning in the compute cluster. At step 454, the provider determines whether the expression object includes a user-supplied data partitioning operator. If the expression includes an operator, the compiler adds the operator to the EPG at a vertex at step 458. The vertex will accept the input dataset at an input edge of the graph and output the partitioned subsets as one or more output edges. If the expression object does not have a user-supplied partitioning operator, the compiler adds a default dynamic partitioning operator to the EPG for the dataset at step 456. Whereas the compiler supplied partitioning operator is dynamic to allow re-partitioning during dynamic optimization of the EPG at runtime, the user-supplied operator will be used to enforce a particular partitioning scheme. After adding the user-defined partitioning to the EPG or a default partitioning, the execution provider 314 will continue compiling the graph of step 460.

Various types of partitioning operators are provided in accordance with one or more embodiments. FIG. 11A is an exemplary signature 470 for a hash partitioning operator in accordance with one embodiment, denoted HashPartition<Tsource, TKey> in this particular example. The hash-partitioning operator described in FIG. 11A takes a dataset and applies a hash coded key to partition the dataset into a number of user-defined partitioned subsets. The operator hash-partitions the dataset source based on the key specified by the key selection function keySelector. The hash code for a key k is computed using comparer.GetHashCode(k). If comparer is left null, EqualityComparer<Tkey>.Default is used. The argument count specifies the number of partitions.

FIG. 11B is an exemplary signature 472 for a hash partitioning operator similar to that described in FIG. 11A. Again, the dataset source is hash-partitioned on a hash-coded key k, which is computed using comparer.GetHashCode(k) or EqualityComparer<Tkey>.Default if comparer is null. Unlike the operator in FIG. 11A, however, the hash partition defined in FIG. 11B hash partitions the dataset into a number of partitions determined dynamically at runtime. Thus, while the user specifies the type of partitioning, the execution provider will determine the optimal number of partitions at runtime.

Query 1 illustrates an exemplary query that may be written in the sequential application program language to invoke one of the hash-partitioning operators. This particular query hash-partitions the dataset logitems into 100 partitions based on the key query, which itself is a field of logitems. Because the comparer argument is left null, the hash code of a key k is determined using a default function EqualityComparer<TKey>.Default.

logItems.HashPartition($x$=>x.query, 100, null)      Query 1

FIG. 12A is an exemplary signature 474 for a range partitioning operator RangePartition<TSource, TKey> in accordance with one embodiment. The input dataset is range-partitioned into a user-supplied number of data subsets using a key specified by a key selection function. The key k is specified by the key selection function keySelector in FIG. 12A. The argument rangeKeys specifies the list of keys used to divide the partitions. If comparer is null, Comparer<Tkey>.Default is used. The number of partitions is equal to rangeKeys.Length+1.

FIG. 12B describes a range partitioning signature 476 where the number of data partitions is determined dynamically at runtime, rather than being user-defined. The operator range-partitions the dataset source based on the key k specified by the key selection function keySelector. If comparer is null, Comparer<TKey>.Default is used. The number of partitions and the partition keys are determined dynamically at runtime. The execution provider determines the number of partitions and calculates the keys to determine the ranges for the partitioned data to optimize the job's completion in the compute cluster.

Query 2 illustrates an exemplary query that may be written in the sequential application program language to invoke one of the range-partitioning operators. This particular query range-partitions the dataset population into nine partitions based on the key age, which is a field of the population dataset.

Int[ ]keys=int[ ]{10, 20, 30, 40, 50, 60, 70, 80}; population.RangePartition ($x$=>x.age, keys, null)      Query 2

Fork

The data partitioning operators take a single dataset as an input and output a single dataset that is partitioned into subsets, which together form the original dataset. An additional operator, hereinafter referred to as Fork for convenience, is provided to accept a single dataset as an input and provide multiple datasets as output. Because some native constructs utilize single output operators as a standard interface, the Fork operator provides multiple datastreams within a single object. In this manner, native operators that have a single output can return multiple datastreams within the single object of the output. The abstract class IMultiQueryable if defined with the possibility for multiple datastreams within a single object. By applying the Fork operator to a dataset, a user can write the individual records of a dataset to multiple datastreams within a single output object.

FIG. 13A is an exemplary signature 480 of an operator Fork<T, R1, R2>. The operator Fork applies a user-defined function mapper to an input dataset source to generate two output streams of type R1 and R2. The operator takes as input a stream of records of type T from the dataset source. The operator returns a single object containing two output streams of tuples having a type ForkTuple<R1, R2>.

FIG. 13B is an exemplary signature 482 of another operator for returning multiple datasets in a single object from the output of an operator. The operator Fork<T, R1, R2, R3> is similar to the operator in FIG. 13A but returns three datastreams. A user-defined function mapper is applied to a dataset source of type T to generate an object with three output streams of tuples having a type ForkTuple<R1, R2, R3>.

FIG. 13C is an exemplary signature 484 of an operator Fork<T, K> that takes an input dataset and returns a single object containing a collection of datasets based on a set of keys. The operator accepts as a first argument a dataset that is to be split into multiple datastreams. In this example, the input dataset is source having a type T as specified by the IQueryable<T> interface. The operator accepts a second argument, in this example keySelector, which specifies a function to be used for calculating a key from each record in dataset source. The keySelector function takes each record of type T and computes a value of type K. The third argument, keys, is an array of keys for dividing the input dataset into different datastreams. The size or length of the array corresponds directly to the number of different output datastreams there will be. For each record in the input dataset, the calculated key value is compared with the array of keys. If a record's key value matches one of the keys in the array, the record is mapped to the datastream corresponding to the matching key in the array. If a record's key does not match any key in the array, that record can be discarded and not mapped to any of the datastreams within the object.

Figure 14:
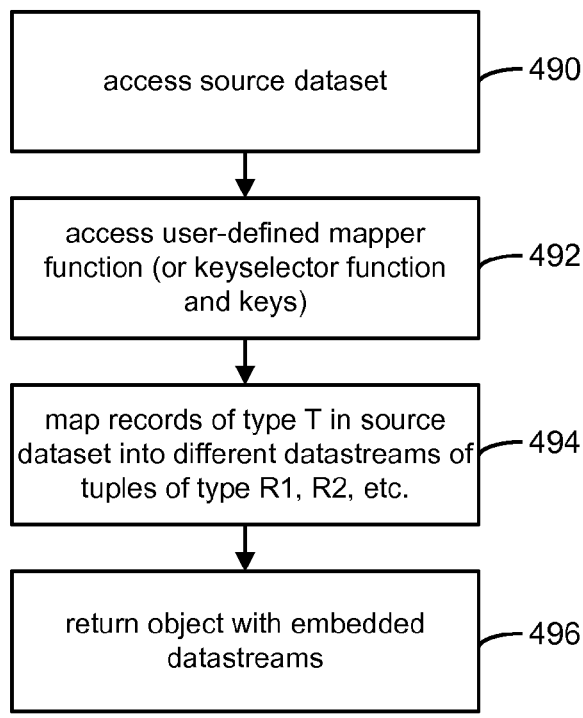
FIG. 14 is a flowchart describing operation of vertex code in accordance with one embodiment that divides an input dataset into multiple datastreams.

FIG. 14 is a flowchart describing the execution of vertex code at one or more compute nodes during evaluation of the Fork operator to embed multiple datastreams within a single dataset object. At step 490, the source dataset is accessed. Step 490 may be performed in parallel at multiple compute nodes for different partitions of the input dataset. At step 492, the user-defined mapper function is accessed if the Fork operator utilizes a mapper function in dividing the dataset into distinct streams. If a key selection function is used by the operator, step 492 includes accessing the key selector function and a set of keys for performing the Fork operation. At step 494, records of a first type (e.g., T) in the source dataset are mapped into different datastreams comprising tuples of a second and third datatype (e.g., R1, R2). At step 496, the compute node(s) return an object with the different datastreams embedded therein.

Two properties of the abstract class IMultiQueryable<R1, R2> are provided for accessing the individual datastreams within objects resulting from invocation of the Fork operator. Property 1 defines a method using the get function for returning the first datastream, R1, of IMultiQueryable<R1, R2> as an IQueryable<R1> object denoted First. Property 2 defines another method using the get function for returning the second datastream, R2, of IMultiQueryable<R1, R2>as an IQueryable<R1> object denoted Second.

public IQueryable<R1>First {get;}                property 1 public IQueryable<R2>Second {get;}               property 2

FIG. 15 is an exemplary set of pseudocode 498 illustrating the use of property 1 and property 2 to retrieve the datastreams within an IMulitqueryable<R1, R2>object. The first line of code 498 defines a first variable object q. The object q is defined by invoking the Fork operator on an input dataset source. The Fork operator splits a stream of integer pairs from source into two output streams q1 and q2 which both reside within the single object q. The second line of code returns the first datastream as q1 by invoking the First method from the first property of class IMultiQueryable<R1, R2>. The third line of code returns the second datastream as q2 by invoking the Second method from the second property of class IMultiQueryable<R1, R2>.

Although the Fork operator is principally described in the context of data parallel computing, it can be used in other contexts as well. For example, the operator can be invoked within an application written in multi-core processing languages to cause execution across the different cores of a multi-core processor having a shared memory. An input dataset can be mapped to multiple datastreams within a single object. Each datastream from the object can be independently provided to a different core within a multiple-core processor for parallel processing.

Apply

The distributed execution provider provides a range of system operations that invoke distributed execution in the compute cluster. In some instances, developers may wish to supply user-defined functions beyond the system operations for execution in the distributed compute cluster. In accordance with one embodiment, an operator is provided to allow a developer to specify that a certain user-defined function should be applied to a dataset within the distributed computing system. This operator, hereinafter referred to as Apply for convenience, is provided to allow user-defined functions to be executed across an entire dataset without regard to data partitioning. Generally, user-defined functions written in high-level sequential languages are assumed to be applied to a dataset on a single machine. The Apply operator allows the user to write the function for a single dataset from this single machine perspective, but have the function executed over a dataset that is partitioned across multiple machines. The operator takes a function and passes it to an iterator over the entire input collection, thereby allowing arbitrary streaming computations. The Apply operator can be invoked on datasets automatically partitioned by the compiler, datasets having a user-defined partitioning operator applied as described above or datasets that are already partitioned, for example, by the way a user constructed the file(s) storing the dataset. As will be described in more detail hereinafter, the Apply operator can be invoked to stream all partitions of a dataset to a single machine for application of the user-defined function in one embodiment. In another, the operator can be invoked to apply the user-defined function to the individual partitions of the dataset that are distributed across multiple machines.

FIG. 16A is an exemplary signature 502 for an Apply operator in accordance with one embodiment for applying user-defined functions to datasets partitioned across multiple machines. The operator accepts two arguments of type T. The first argument source is the input dataset. The second argument procFunc is the user-defined function. The operator will perform execution of the procFunc user-defined function across the entire dataset source, regardless of the dataset's partitioning. FIG. 16B is a signature 504 for another exemplary Apply operator similar to that of FIG. 16A. The operator in FIG. 16B will perform the user-defined function across two input datasets. The additional argument source2 is the second input dataset.

FIG. 16C is an exemplary set of pseudocode to illustrate application of a user-defined function using the Apply operator. The pseudocode in this example is a user-defined method SlidingAverage written in C#. The Apply operator can be used with this method to perform "windowed" computations on a sequence, where the ith entry of the output sequence is a function on the range of input values [i, i+d] for a fixed window of length of d. In this example, the SlidingAverage function computes the average of every sliding window of 10 integers over a stream of integers. The method accepts a stream of integers from source as input, and produces a stream of doubles as output. The local variable window is used to maintain the current sliding window. By invoking the Apply operator, Query 3 below applies the SlidingAverage method to each item in the source dataset without regard to the partitioning of the dataset over multiple machines.

source.Apply (x=>SlidingAverage (x))  Query 3

The Apply operator can apply user-defined functions to each partition of a dataset in isolation on individual machines or apply functions to an entire dataset by streaming the dataset to a single node. An annotation is provided in one embodiment to allow a user to designate whether a given method should be applied to an entire dataset or whether it can be applied to individual portions in parallel. The annotation, hereinafter referred to as homomorphic, is supplied in one embodiment as a simple attribute (e.g., .NET) to indicate opportunities for parallelism. If the homomorphic annotation is asserted for a given method and the Apply operator is invoked on the method, the system will treat the method as being operable on the individual dataset partitions. If however, the homomorphic annotation is not asserted for the method, the system will treat the method as needing to be applied on the dataset in its entirety. Generally, a given method m is said to be homomorphic if the condition holds that m(concat(x, y))=concat(m(x), m(y)) for any data partitions x and y. Consider the earlier example of the SlidingAverage method depicted in FIG. 16C. If the user adds the annotation [homomorphic] to the method definition and invokes the method using the Apply operator, the execution provider 314 will utilize this information to generate an efficient execution plan. The plan can provide for execution of the method on individual data partitions (either user or system defined) in parallel rather than force the individual partitions to a single node to reconstruct the dataset for application of the method all at once.

Figure 17:
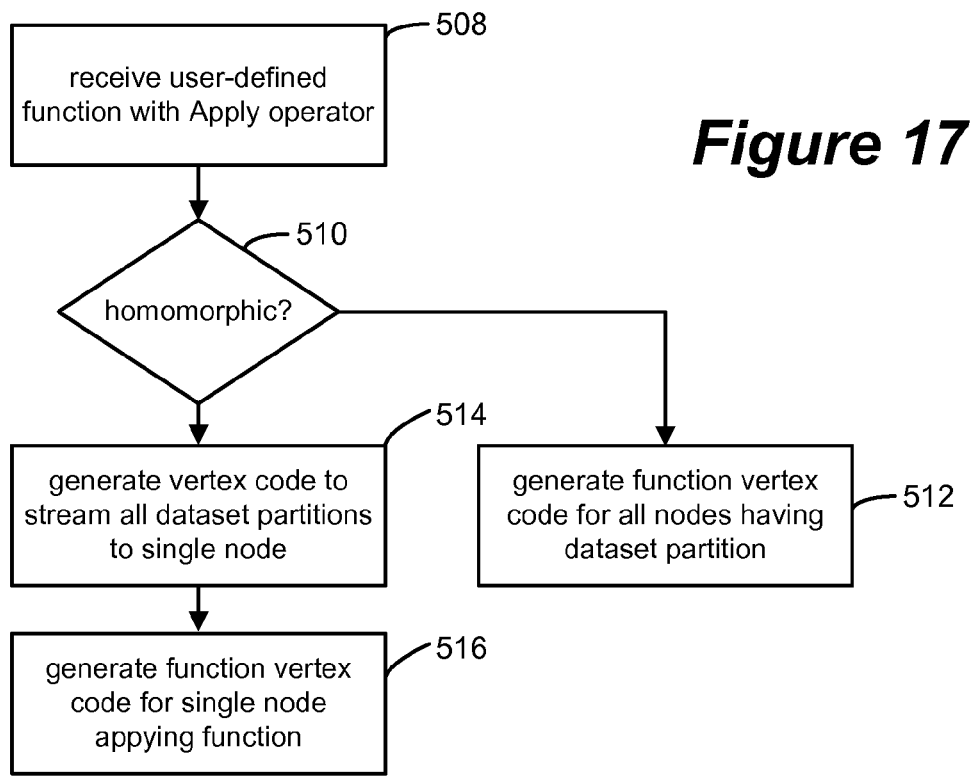
FIG. 17 is a flowchart describing the automatic generation of an execution plan and vertex code for expressions invoking an Apply operator for a user-defined function.

FIG. 17 is a flowchart describing operation of the distributed execution provider in one embodiment to generate an execution graph and vertex code for an expression including an Apply operator. At step 508, the execution provider 314 receives an expression from the user application having a user-defined function which is invoked using the Apply operator. At step 510, the provider determines whether the user-defined function includes the homomorphic annotation. If the function is annotated as homomorphic, the execution provider generates an execution graph and vertex code at step 512 for the expression. The execution provider generates a plan for execution of the method invoked by the Apply operator at all compute nodes that include a partition of the dataset operated on by the method. If the dataset is partitioned across multiple nodes, the execution provider generates vertex code for each node at which a partition resides. In this manner, the method will be executed in a distributed data-parallel fashion at a plurality of nodes.

If the function is not annotated as homomorphic, the execution provider generates an execution plan graph and vertex code at steps 514 and 516. Because the function is not homomorphic, the execution plan will specify that all partitions of the dataset operated on by the function be streamed to a single node for application of the function. At step 514, the execution provider generates vertex code for each of the nodes having a partition of the dataset. The vertex code streams the various partitions to a single node where they can be reconstructed into the original dataset. At step 516, the provider generates vertex code for the node where the dataset partition are to be streamed. The vertex code generated at step 516 applies the user-defined function to the dataset in its entirety.

FIG. 18A is another exemplary set of code 520 representing a user-defined function invoked using the Apply operator, further illustrating application of the homomorphic annotation. The user-defined function addeach adds the corresponding numbers in two streams of the same length. The per-vertex transformation is shown in FIG. 18, which is operable on IEnumerable inputs. The function iterates over two streams IEnumerable<int>left and IEnumerable<right> in parallel using the MoveNext( ) and Current stream operators. Other operators such as foreach could be used. To create the IQueyable version of this addition that is operable across two input datasets, the addeach method is invoked on the two inputs using the Apply operator using the pseudocode 522 illustrated in FIG. 18B.

Figure 19A:
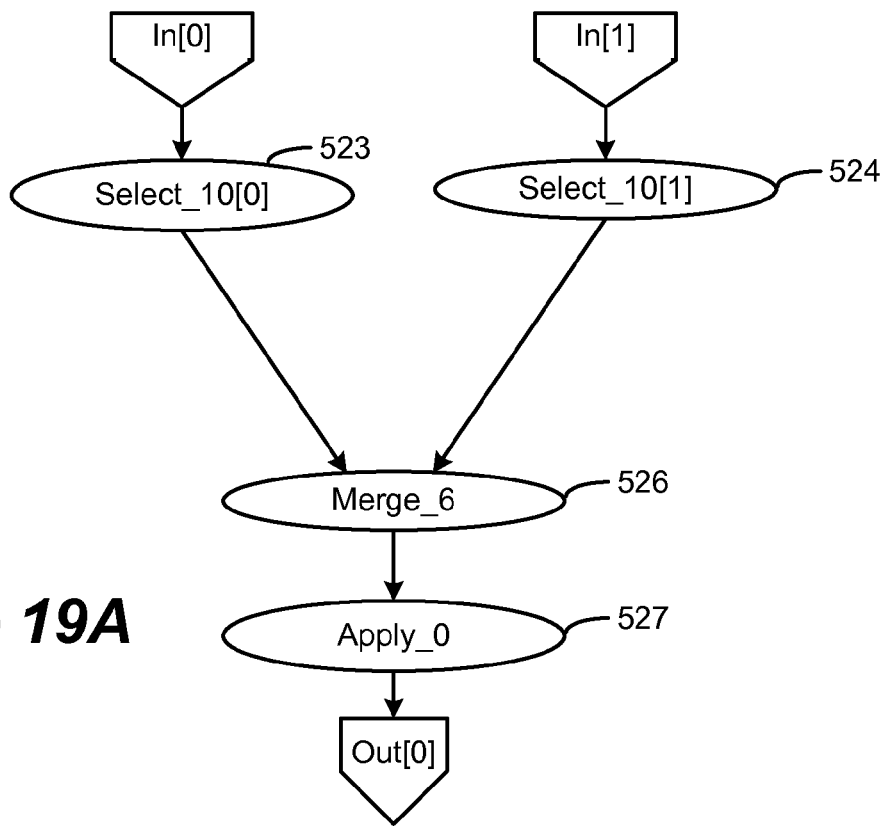
FIG. 19A is an exemplary execution plan graph for an expression invoking an Apply operator for a user-defined function that is not annotated as homomorphic.
Figure 19B:
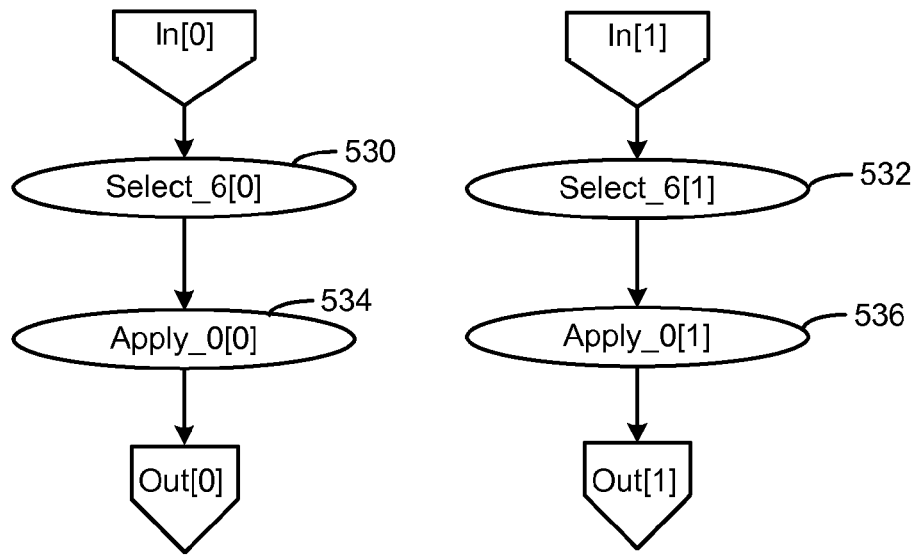
FIG. 19B is an exemplary execution plan graph for an expression invoking an Apply operator for a user-defined function that is not annotated as homomorphic.

FIGS. 19A and 19B depict execution plan graphs that implement the addeach function using the Apply operator across the two input datastreams. FIG. 19A depicts the execution plan when the homomorphic annotation is not applied to the method addeach and FIG. 19B depicts an execution plan when the homomorphic annotation is applied. In FIG. 19A, input In[0] includes a partition of the first dataset and a partition of the second dataset serving as input to vertex 523. Input In[1] includes a partition of the first dataset and a partition of the second dataset serving as input to vertex 524. The various partitions of each input datastream are first merged to recreate the entire datasets. Merge_6 represents the merging of the first dataset and the second dataset at a single vertex 526 using the individual partitions spread through the cluster. The completed datasets are then used as input to the addeach function invoked by the Apply_0 operator, which resides at a single vertex 527 in the distributed compute cluster. Accordingly, parallel execution of the addeach method is not performed as a single machine will be used to facilitate streaming through the entirety of both datasets.

In FIG. 19B, the system interprets the homomorphic annotation on the addeach method as indicating that the individual data partitions can be operated on in isolation. The system generates the execution plan accordingly to exploit the potential parallelism. The various partitions at different computing machines are not merged. Rather, the corresponding records in each stream at a single vertex are first selected and then utilized as input to the addeach function which is invoked using the Apply operator at that vertex. Input In[0] is selected at a vertex 530 and input In[1] is selected at another vertex 532. As illustrated, the addition is performed in parallel at a number of vertices, generating individual outputs. The addeach function is applied to the partitions in input In[0] at vertex 534 and to the partitions in input In[1] at vertex 536. Although not shown, these outputs could be later merged to form a single output.

In one embodiment, the homomorphic annotation includes optional flags to further define the nature of the homomorphic apply. A "KeySelector" and "PartitionType" flag specify that the function is homomorphic under the condition that the input is partitioned by the KeySelector and PartitionType. If the input is not partitioned according to the specified type, the method will not be treated as homomorphic. These flags can be used independently or together. The compiler will automatically re-partition the data to match the specified conditions if possible.

The homomorphic operator includes the flag "Left" in one embodiment that can be used to further define the homomorphism for a two input function. If the "Left" flag is asserted, the partitions of the dataset for the first input remain undisturbed at their individual vertices. The partitions of the dataset for the second input, however, are merged and the entire second input dataset is provided to each of the vertices having one of the first input dataset partitions.

ToLazyTable and Materialize

It is often useful for the distributed execution engine to utilize so-called lazy evaluation at runtime. The engine will build up an expression tree in memory and only cause execution when the application attempts to retrieve one of the output tables from the expression. When standard operators capable of expression in a tree structure are invoked, facilitating lazy evaluation is relatively straight forward. If more complicated operators are invoked, such as the aforementioned Fork to divide an input dataset or Apply to execute a user-defined function across an entire dataset, the execution tree is not always capable of a tree expression. Such execution plans may still benefit from lazy evaluation, however. Accordingly, a set of operators is provided in one embodiment to allow a user to specify that an operation only be executed when instructed. In this manner, multiple queries including standard operators and more complicated ones can be simultaneously invoked to generate multiple outputs as a single job. By utilizing this set of operators, the developer can direct pipelining of multiple expressions into a single job.

A first operator, hereinafter referred to as ToLazyTable, instructs the system that the referenced query is to be evaluated and a table created, but that such evaluation should be delayed until specifically invoked. FIG. 20A sets forth an exemplary signature 550 for a ToLazyTable operator in accordance with one embodiment. The operator accepts two arguments, source and filename. The first argument source indicates the input dataset to which the operator is to be applied. The second argument filename specifies the output table that is to be created using the input dataset. The second operator, Materialize, instructs the system to execute the query or queries to which the ToLazyTable operator was applied. FIG. 20B sets forth an exemplary signature 552 for a Materialize operator in accordance with one embodiment. The Materialize operator accepts a single argument tables, which specifies the tables that are to be created when the materialize operator is invoked. Consider the exemplary pseudocode 554 depicted in FIG. 20C. The first line of code takes an input dataset source and produces two output datasets q.First and q.Second using the Fork operator earlier described. The second line of code stores the first output dataset q.First in a first table "result1." The third line of code stores the second output dataset q.Second in a second table "result2." Under a normal process flow without the ToLazyTable operator, the second line of code would be evaluated before the third line of code. Because the system does not know that something is to be done with the second output dataset when it evaluates the second line of code, it will write q.First to table "result1" as a single computation by invoking the Fork operator on source to retrieve the first output dataset. The system will then move to line 3, where it will write q.Second to table "result2" as a second computation, again invoking the Fork operator on source to retrieve the second output dataset. Accordingly, the Fork operator is performed twice.

As shown in FIG. 20C, q.First and q.Second are invoked using the ToLazyTable operator in lines 2 and 3. The system is instructed to create the first and second tables from outputs q.First and q.Second but to delay doing so until instructed. The materialize operator in line 4 instructs the system to evaluate both expressions, triggering the actual execution to generate q1.First and q.Second and write the results to tables "result1" and "result2." Such a sequence allows the system to generate both results tables from multiple queries as a single job. The system can generate both results tables using a single computation and invocation of the Fork operator to retrieve both datasets q.First and q.Second, thereby saving computation resources. Moreover, the execution provider can pipeline these expressions together as a single job to be executed together in the distributed compute cluster. It is noted that the execution provider can pipeline other expressions that are not necessarily invoked using the ToLazyTable operator with expressions that are for execution as a single job. For example, the execution provider may be able to semantically identify that certain expressions can be lazily evaluated and formulate a suitable execution plan specifying the various expressions as a single job.

Associative Annotation

High-level query-based languages may provide an aggregate operator that aggregates the results of a function applied to a stream of integers, as demonstrated in the example of FIG. 3. An associative annotation is provided in one embodiment that instructs the system that a method is associative, and thus, that the aggregate function may be applied on each partition of the dataset independently in parallel. The system can compute the final results by combining the intermediate results produced on the partitions. A method m is said to be associative if the condition holds that m(m(m(s0, a), b), c)=m(m(s0, a), m(m(s0, b), c)) for some seed s0 and any data records a, b and c.

FIG. 21A is an exemplary set of pseudocode 600 that computes the sum of all values in a text file. It first parses the file as a set of floating-point values, one per line. The method then computes the sum of the first two values from the file, followed by computing the sum of the next two values until the entire file is parsed. After computing the sums of pairs of values from the file, the intermediate results are aggregated by taking the sum of each intermediate result to determine the total sum of all values in the file.

An example of an execution plan graph 318 for the distributed application of the code of FIG. 21A is illustrated in FIG. 21B. The input file is divided into two partitions In[0] and In[1]. A first vertex 602 reads in the data from the first partition using a select function. A second vertex 604 reads in the data from the second partition of the input file using a select function. The data from each partition is then provided to a third vertex 606 which collects the data from the two input readers. The aggregate vertex implements the addition to add the pairs of values from the entire dataset, followed by aggregating the intermediate results to determine the total sum of all values in the file.

If the associative annotation is added to the Add method as depicted in the pseudocode of FIG. 22A, a more efficient execution plan can be generated by the execution provider as illustrated in FIG. 22B. With the knowledge that the method can be applied to individual partitions of the input file, the execution provider can promote parallelism in the computation of the pairs of input values. A first vertex 622 reads in the data from the first partition as in FIG. 21B. However, vertex 622 also performs the Add function on pairs of values from the first partition. The first vertex 622 will aggregate the intermediate results obtained from the first partition before passing the results to vertex 626. Likewise, the second vertex 624 reads in the data from the second partition and performs the Add function on pairs of values from the second partition. The second vertex 624 aggregates these intermediate results obtained from the second partition before passing the results to vertex 626. Vertex 626 performs an aggregate of the Add function to combine the intermediate results from the first partition and the intermediate results from the second partition. FIG. 22B is a more efficient execution plan that exploits parallelism in the intermediate result calculations by using multiple compute nodes. Different machines are used to perform the Add function on the first and second data partitions to more efficiently compute these intermediate results. The intermediate results are then provided to a single vertex to aggregate the results and provide a final result of the total sum of all values in the file.

An optional "combiner" function is provided in one embodiment to specify if the final result of the aggregate function is produced by a function different than the method that is declared to be associative. For example, Query 4 applies a custom aggregate function CubeSum to a stream of integers from a source dataset.

source.Aggregate (0, (s, x)=>CubeSum(s, x))           Query 4

The pseudocode 630 for the CubeSum function is depicted in FIG. 23. The function is annotated by the Associative attribute to indicate that the method Cubesum is associative such that it can be applied to individual partitions of its input dataset. The "combiner" function is specified to indicate that the final result will be produced by the function "AddInt" and not the method CubeSum.

Resource

In one embodiment, an annotation is provided to allow developers to declare methods or user-defined functions as not stateful. A method is said to be stateful if it causes the consumption of memory in proportion to the size of its input. The execution provider considers whether expressions are stateful in developing and optimizing execution plans. For example, the provider attempts to pipeline multiple operators together in a single process for execution as a single job in many instances. Methods that consume memory in proportion to the size of their input are examined to determine whether a job will consume more memory at a particular compute node than is available. Generally, the execution provider analyzes expressions semantically to determine whether they are stateful. For example, the provider can determine semantically that the "select" operator is not stateful. The execution provider understands that this operator requires holding one row of an input dataset in memory at a time. Thus, while the operator may invoke an entire dataset, it will not consume memory in proportion to the size of the dataset. Similarly, the execution provider can identify that a "Sort" operator requires that a dataset or partition be maintained in memory in its entirety. In instances where the execution provider does not have knowledge or is unable to determine the memory usage of a given function, the system will assume the function to be stateful.

User-defined functions that may be invoked using the Apply, Aggregate, Fork or other operator are examples of expressions that may not be capable of semantic analysis by the execution provider to determine whether they are stateful. In accordance with one embodiment, an annotation is provided to allow users to override the default 'stateful' assumption for unknown methods. This annotation may be referred to as a "resource" annotation for convenience. For user-defined methods known not to be stateful, the user can add the "resource" annotion to the method to instruct the execution provider that the method is not stateful. The execution provider will use this information to generate a better execution plan. With the knowledge that the method is not stateful, the execution provider can define execution of the method without regard to the size of the input partition or dataset for the method. For example, the execution provider can place the method in a pipeline with other methods at a common vertex to be executed as a single job.

Consider the exemplary SlidingAverage method earlier described. As a user-defined method, the execution provider is unable to determine semantically whether the method is stateful. The user writing the method may know that the method computes an average of 10 integers and thus, will only need to maintain 10 records of the input dataset in memory at a given time. Because the method's memory usage is independent of the input dataset size, the user can declare the method as not stateful. Pseudocode 1 below can be added before the method definition to instruct the execution provider that the method is not stateful and thus, can be pipelined or otherwise optimized with other functions.

[Resource(IsStateful=false)]           Pseudocode 1

Field

In one embodiment, the distributed execution engine assumes that all fields of classes can be null. This assumption can lead to less than optimal execution plans being generated in some instances. Each time a dataset needs to be written to disk or transferred across the network (e.g., to a different vertex), the dataset will be serialized at the originating compute node and deserialized at the receiving compute node. If a field can be null, the execution engine will generate a plan accounting for the serialization and deserialization of fields that may be null.

In order to better optimize execution plans, one embodiment provides an annotation to allow a user to declare that a field cannot be null. The execution engine will access that annotation and if the field cannot be null, optimize the execution plan accordingly. With knowledge that certain fields are not nullable, the engine can optimize the plan to decrease the amount of network traffic and disk I/O. Consider the definition 640 for the exemplary Person class depicted in FIG. 24. In this simplified example, the class Person includes the fields name and nickname. The cannot be null annotation is asserted for the nickname field, but not the field name. Accordingly, the execution engine can thus determine that for the name field, it must account for the possibility of null value. However, the engine will determine that for the nickname field, null values are not allowed and thus, that such accounting is not necessary.

Field Mapping

It is not infrequent that operators transform records from one type to another using arbitrary methods (e.g., user-defined). In such instances, the distributed execution provider may be incapable of inferring information relating to the transformation that may be useful in the optimizing the execution plan. Accordingly, one embodiment provides an annotation, hereinafter referred to as FieldMappling for convenience, to allow users to specify relatedness between fields or expressions, such as a specification of how data flows from one datatype to another datatype. Consider the following exemplary query 5 that transforms records of type Pair to records of type Pair2.

from pair in pairs select new Pair2(pair);           Query 5

An exemplary definition 650 of the class Pair2 is shown in FIG. 25. The definition reveals an obvious correspondence between both the 'x' and 'y' fields of records of type Pair and records of type Pair2. The individual records in the dataset "pair" are not altered by the query. Rather, the records are merely transformed between datatypes. If we consider for exemplary purposes that the dataset pairs is hash partitioned by Pair.x, we can see that the dataset resulting from execution of the query above will be has partitioned by Pair2.pair.x. Because the distributed execution engine may not be able to infer the correspondence between fields in records of type Pair and type Pair2, the generated execution plan will call for a repartitioning of the dataset resulting from execution of the query.

In order to better optimize execution plans, one embodiment provides an annotation whereby users can specify relationships between fields. Continuing with the example in FIG. 25, the FieldMapping annotation is used to declare mappings between certain fields of records of type Pair and records of type Pair2. Specifically, a first field mapping at line 4 specifies that "p.x" from class Pair2 maps to pair.x from class Pair. Similarly, a second field mapping at line 5 specifies that "p.y" from class Pair2 maps to pair.y from class Pair. By explicitly declaring the relationship between these fields, the execution engine generates a better exaction plan. If the dataset pairs is hash partitioned using the 'x' field, the execution engine can use the field mapping to avoid repartitioning the result of the query. Because the resulting dataset is already hash partitioned using the same key by virtue of the relationship between the 'x' fields, the execution plan avoid a re-parititoning.

The FieldMapping annotation is extended to lambda expression in one embodiment to allow the specification of relations between transformations according to different lambda expressions. In this aspect, the user-specified mapping is applied to specify a correspondence between lambda expressions. Consider a first lambda expression that operates on a tuple of type A to achieve a result. If the user knows that a different lambda expression that operates on a tuple of type B will achieve the same result, a mapping annotation can be added in the appropriate class to map the lambda expressions. This mapping is used by the execution engine to generate a more efficient plan. For example, the result of execution of the first lambda expression can be accessed to determine the result of the second lambda expression rather than specifying the actual evaluation of the second lambda expression.

Dataset Properties

The optimization of execution plans is enhanced in one embodiment through the use of user-specified properties for datasets. As earlier described, the execution engine will automatically partition datasets in some instances. In others, a developer may invoke one of the number of partitioning operators earlier described that allow user-defined partitioning of dataset. It is also possible that a dataset is partitioned before being imported into the distributed execution system. For example, a user may include a dataset in an application that is partitioned in a manner known to the user. The execution engine may be unable to discern that the dataset is partitioned. Accordingly, one embodiment provides one or more methods that allow a user to specify a partitioning property for a dataset.

FIG. 26 is an exemplary signature 700 for a method to allow a user to assert a hash-partition property for a dataset. The method asserts that a source dataset is hash-partitioned on the key computed by the key selection function keySelector. The hash code for a particular key k is computed using comparer.GetHashCode(k). If comparer is null, EqualityComparer<TKey>.Default is used. By invoking the method AssumeHashPartition on a dataset, the user can instruct the execution engine as to the nature of the dataset, namely, that it has been hash-partitioned according to the provided parameters.

Consider the exemplary query 702 in FIG. 27. Query 707 groups people in the source dataset population according to their birthdays. Before invoking the groupby operator to divide the people in the population dataset, the execution engine will perform some type of hash partition on the birthday field for the dataset records. If the dataset population is already hash partitioned using this field, an additional hash partitioning is not necessary. Accordingly, the user can specify the partitioning of the dataset by invoking the AssumeHashPartition method as indicated in line 1. The user invokes the method with arguments specifying that the population dataset is hashpartitioned using the birthday field as a key using keyselection function x. Comparer is left null such that EqualityComparer<TKey> is used.

Similar to the AssumeHashParition operator, an AssumeRangePartition operator is provided in one embodiment for instructing the engine that a dataset is range partitioned. FIG. 28 sets forth an exemplary signature 704 for an AssumeRangePartition method in accordance with one embodiment. This method asserts that the source is range-paritioned on the key computed by the key selection function keySelector. The argument rangeKeys specifies the list of keys to divide the partitions. The comparison function is comparer.Compare( ). If rangeKeys is null, the actual keys and number of partitions is left undeclared. If comparer is null, Comparer<TKey>.Default will be used.

One embodiment includes a method for asserting a dataset is already sorted in a particular manner. FIG. 29 sets forth an exemplary signature 706 for a method, hereinafter referred to as AssumeOrderBy for convenience, that allows a user to specify properties associated with an already sorted dataset. The method asserts that each paritions of the source dataset is sorted on the key computed by the key selection function keySelector. The comparison function is comparer.Compare( ). If comparer is null, Comparer<TKey>.Default is used.

A user can specify that an entire table is sorted using a combination of the AssumeRangePartition and AssumeOrderBy methods. If both methods are asserted for a source dataset using the same key selection function, the source dataset of an entire table will be interpreted as being sorted.

A method is provided in one embodiment to enable a user to assert that all records in a source are distinct. An exemplary signature 708 for a method, hereinafter referred to as AssumeDistinct for convenience, is depicted in FIG. 30. The comparison function is comparer.Compare( ). If comparer is null, Comparer<TKey>.Default is used. By invoking the AssumeDistinct method for a dataset, the execution engine assumes that every element in the set is distinct when passed to the comparison function. The execution engine can generate a more effective execution plan by not having to account for the possibility of non-distinct elements in the source.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the disclosed subject matter be defined by the claims appended hereto.

What is claimed is:

1. A machine implemented method for distributed parallel processing, comprising:

accessing an expression from a sequential program that is executing at a first machine, the expression invoking at least one extension for distributed parallel processing by a distributed execution engine, wherein the distributed execution engine includes a compute cluster having a plurality of nodes, the at least one extension is an operator specifying a user-defined function using data parallel processing, and wherein the user-defined function is in a high-level programming language and receives a first dataset;

automatically generating an execution plan for parallel processing of the expression by the distributed execution engine using the at least one extension, wherein the automatically generating the execution plan includes:
    specifying a partitioning of the first dataset at a set of nodes from said plurality of nodes;
    determining whether the user-defined function includes an annotation that the user-defined function is operable on partitions of the first dataset;
    if the user-defined function includes the annotation, automatically generating code for executing the user-defined function in parallel at the set of nodes; and
    if the user-defined function does not include the annotation, automatically generating code for streaming partitions of the first dataset to a single node and code for executing the user-defined function at the single node; and
    providing the execution plan to the distributed execution engine for controlling parallel execution of the expression.

2. A machine implemented method according to claim 1, wherein:
    the distributed execution engine controls parallel execution of the expression in the compute cluster;
    automatically generating the execution plan includes automatically generating an execution plan graph having vertices, automatically generating code based on the at least one extension and assigning the code to particular vertices in the execution plan graph, the automatically generating the execution plan being performed by a distributed execution provider; and
    the machine implemented method further comprises distributing the code to nodes in the compute cluster corresponding to the particular vertices in the execution plan graph.

3. A machine implemented method according to claim 2, wherein:
    the expression includes a language integrated query.

4. A machine implemented method according to claim 1, further comprising:
    if the user-defined function includes the annotation, outputting the code for executing the user-defined function in parallel to the set of nodes; and
    if the user-defined function does not include the annotation, outputting the code for streaming partitions of the first dataset to the set of nodes and outputting the code for executing the user-defined function to the single node.

5. A machine implemented method according to claim 4, wherein the single node is part of the set of nodes.

6. A machine implemented method according to claim 1, wherein the automatically generating an execution plan includes:
    determining whether the user-defined function includes an annotation specifying the function is not stateful;
    if the user-defined function includes the annotation specifying the function is not stateful, automatically generating a first version of the execution plan; and
    if the user-defined function does not include the annotation specifying the function as not stateful, automatically generating a second version of the execution plan.

7. A machine implemented method according to claim 1, further comprising:
    determining whether the first dataset includes a partitioning property;
    if the first dataset includes a partitioning property, optimizing the execution plan such that the first dataset is not re-partitioned in the compute cluster; and
    if the first dataset does not include a partitioning property, specifying a partitioning of the first dataset in the execution plan and dividing the first dataset into individual partitions at nodes of the compute cluster according to the specified partitioning.

8. A machine implemented method according to claim 1, wherein:
    the first dataset is of a type having a first field;
    automatically generating the execution plan includes determining whether the first field includes an annotation that the first field is not nullable; and
    if the first field includes the annotation that the first field is not nullable, optimizing the execution plan based on presence of the first field not being nullable.

9. A machine implemented method according to claim 1, wherein:
    the first dataset is of a type having a first field;
    automatically generating the execution plan includes determining whether the expression includes an annotation mapping the first field to a second field of a second dataset; and
    if the first field is mapped to a second field of a second dataset, generating the execution plan to access an output of a second expression referencing the second dataset to determine a result of evaluating the first expression.

10. A distributed parallel processing system, comprising:
    a compute cluster including a plurality of nodes, each node including at least one processor;
    an execution provider that accesses expressions from a sequential program that is running at a first machine, the execution provider receives at least one expression specifying an extension for distributed data parallel processing in the compute cluster, the execution provider automatically generates an execution plan graph and code for vertices in the execution plan graph using the extension for distributed data parallel processing, wherein the extension is an operator specifying division of a first dataset into multiple datastreams at the compute cluster, the code for at least one of the vertices receives the first dataset and provides a second dataset having at least two datastreams included therein, the two datastreams including records from the first dataset; and
    an execution engine that receives the execution plan graph and the code from the execution provider and manages parallel execution of the expression in the compute cluster based on the execution plan graph and the code, wherein the execution engine distributes the code for the at least one of the vertices receiving the first dataset to one or more nodes in the compute cluster corresponding to the at least one of the vertices.

11. A distributed parallel processing system according to claim 10, wherein:
    the operator is a first operator;
    the execution provider accesses a first expression and a second expression from the program running at the first machine, the first expression generating a first output and the second expression generating a second output, the first expression invoking a second operator specifying deferred execution of the first expression in the compute cluster and the second expression invoking the second operator specifying deferred execution of the second expression in the compute cluster;
    the execution provider accesses a third expression from the program invoking a third operator calling for generation of the first output and the second output;

the execution provider generates the execution plan graph and the code for vertices of the execution plan graph for a single job including the first expression, the second expression and the third expression; and the execution engine generates the first output and the second output from the compute cluster as the single job.

12. A distributed parallel processing system according to claim 10, wherein:

the execution provider accesses a first expression from the program running at the first machine, the first expression invoking a method specifying that the first dataset has been sorted; and the execution provider optimizes the execution plan graph based on the specified sorting of the first dataset.

13. A distributed parallel processing system according to claim 10, wherein:

the execution provider accesses a first expression from the program running at the first machine, the first expression invoking a method specifying that each record of the first dataset is distinct; and the execution provider optimizes the execution plan graph based on each record of the first dataset being distinct.

14. One or more processor readable storage devices having processor readable code stored thereon, the processor readable code programs one or more processors to perform a method comprising:

receiving one or more expressions from an application executing at a first machine, the one or more expressions include an aggregate function that invokes a user-defined function referencing a first dataset;

automatically generating an execution plan for executing the one or more expressions in parallel at nodes of a compute cluster, the automatically generating including:

determining whether the one or more expressions include an extension specifying a particular data partitioning for the first dataset, if the one or more expressions include the extension specifying a particular data partitioning, generating a first execution graph with the first dataset partitioned according to the particular data partitioning, if the one or more expressions do not include the extension specifying a particular data partitioning, generating a second execution graph with the first dataset partitioned according to a different data partitioning, determining whether the user-defined function includes an annotation specifying the user-defined function as associative, if the user-defined function includes the annotation, generating code to apply the aggregate function on the individual partitions of the first dataset and code to combine the results of applying the aggregate function on the individual partitions, and if the user-defined function does not include the annotation, generating code to stream the individual partitions of the first dataset to a single node for application of the aggregate function; and providing the execution plan to an execution engine that controls parallel execution of the one or more expressions in the compute cluster.

15. One or more processor readable storage devices according to claim 14, wherein:

determining whether the one or more expressions include an extension specifying a particular data partitioning includes determining whether the one or more expressions include an extension specifying either hash-partitioning or range-partitioning.

16. One or more processor readable storage devices according to claim 14, wherein the method further comprises:

dividing the first dataset into a plurality of partitions according to the particular data partitioning or the different data partitioning; providing each partition of the plurality to one node in the compute cluster; and executing the one or more expressions in parallel at the nodes of the compute cluster.

17. One or more processor readable storage devices according to claim 14, wherein automatically generating an execution plan further includes:

determining whether the one or more expressions include a property indicating that the first dataset is already partitioned; and if the one or more expressions include the property, generating the execution plan to distribute the first dataset in the compute cluster according to the partitioning indicated by the property.

* * * * *